(12) United States Patent
Meakes

(10) Patent No.: US 6,351,633 B1
(45) Date of Patent: Feb. 26, 2002

(54) HANDLING OF SIGNALING INFORMATION WITHIN A TELECOMMUNICATIONS SYSTEM

(75) Inventor: Gavin John Meakes, Canvey Island (GB)

(73) Assignee: Airspan Networks, Inc., Seattle, WA (US)

( * ) Notice: Subject to any disclaimer, the term of this patent is extended or adjusted under 35 U.S.C. 154(b) by 0 days.

(21) Appl. No.: 09/212,783

(22) Filed: Dec. 16, 1998

(30) Foreign Application Priority Data

Dec. 16, 1997 (GB) .............................................. 9726621

(51) Int. Cl.7 ............................................. H04M 11/00
(52) U.S. Cl. ........................ 455/403; 455/450; 455/68
(58) Field of Search ................................ 455/445, 414, 455/450, 403, 418; 379/229, 230

(56) References Cited

U.S. PATENT DOCUMENTS

| 4,811,420 A | | 3/1989 | Avis et al. ..................... 455/51 |
| 6,115,603 A | * | 9/2000 | Bair et al. ................... 455/414 |
| 6,122,516 A | * | 9/2000 | Thompson et al. ......... 455/450 |

FOREIGN PATENT DOCUMENTS

| GB | 2301746 A | * | 12/1996 | ............. G06F/9/44 |
| GB | 2301746 | | 12/1996 | ............. G06F/9/44 |
| GB | 2301751 | | 12/1996 | ......... H04L/12/403 |
| GB | WO 97/24888 | * | 7/1997 | ............ H04Q/3/00 |
| GB | 2310566 A | * | 8/1997 | ............ H04M/3/24 |
| GB | 2329790 | * | 3/1999 | ............ H04Q/3/00 |
| GB | 2332590 | * | 6/1999 | ............ H04Q/3/00 |

* cited by examiner

Primary Examiner—Daniel Hunter
Assistant Examiner—C. Chow
(74) Attorney, Agent, or Firm—Baker Botts L.L.P.

(57) ABSTRACT

The present invention provides a telecommunications system, and method of operation of such a system, the telecommunication system being arranged to be connected to a telecommunications network and to route telecommunications signals between the telecommunications network and a subscriber terminal of the telecommunications system. The telecommunications system comprises an interface mechanism for passing signaling events over a communications link between modules of the telecommunications system separated by the communications link. In accordance with the present invention, the interface mechanism comprises a network-side object on the telecommunications network side of the communications link for receiving a first signaling event from a first module of the telecommunications system and for generating a first signaling message to represent the first signaling event, and a user-side object on the subscriber terminal side of the communications link for receiving a second signaling event from a second module of the telecommunications system separated from said first module via the communications link, and for generating a second signaling message to represent the second signaling event. Further, the network-side object is arranged to pass the first signaling message to the user-side object over the communications link for subsequent processing by modules on the subscriber terminal side of the communications link, and the user-side object is arranged to pass the second signaling message to the network-side object over the communications link for subsequent processing by modules on the telecommunications network side of the communications link.

14 Claims, 13 Drawing Sheets

| MESSAGE | PARAMETERS (WHEN USED) | DESCRIPTION | DIRECTION |
|---|---|---|---|
| STPOTS_SIG_ALERTING | LineNo, P1, P2 | SIGNALLING MESSAGE TO PLSIG | TO ST |
| STPOTS_SIG_CALL_PROCEEDING | LineNo | SIGNALLING MESSAGE TO PLSIG | TO ST |
| STPOTS_SIG_CONNECT | LineNo | SIGNALLING MESSAGE TO PLSIG | TO ST |
| STPOTS_SIG_CONNECT_ACK | LineNo | SIGNALLING MESSAGE TO PLSIG | TO ST |
| STPOTS_SIG_DISCONNECT | LineNo | SIGNALLING MESSAGE TO PLSIG | TO ST |
| STPOTS_SIG_INFO_LINEFEED | LineNo, P1, P2 | SIGNALLING MESSAGE TO PLSIG | TO ST |
| STPOTS_SIG_INFO_TONE | LineNo, P1, P2 | SIGNALLING MESSAGE TO PLSIG | TO ST |
| STPOTS_SIG_INFOREPLY | LineNo, RESULT STACK | SIGNALLING MESSAGE FROM PLSIG | FROM ST |
| STPOTS_SIG_PARKED_ACCESS | LineNo | SIGNALLING MESSAGE TO PLSIG | TO ST |
| STPOTS_SIG_RELEASE | LineNo | SIGNALLING MESSAGE TO PLSIG | TO ST |
| STPOTS_SIG_RELEASE_COMPLETE | LineNo | SIGNALLING MESSAGE TO PLSIG | TO ST |
| STPOTS_SIG_SETUP | LineNo, P1, P2 | SIGNALLING MESSAGE TO PLSIG | TO ST |
| STPOTS_SIG_SETUP_ACK | LineNo, P1, P2 | SIGNALLING MESSAGE TO PLSIG | TO ST |
| STPOTS_SIG_STATUS_ENQUIRY | LineNo | REQUEST FOR STATUS OF PLSIG | TO ST |
| STPOTS_SIG_STATUS_RESPONSE | LineNo, CALL STATE | RESPONSE TO REQUEST FOR STATUS OF PLSIG | FROM ST |
| STPOTS_SIG_RESTART | LineNo | FORCES A PLSIG RESET | TO ST |

*FIG. 10*

| MESSAGE | PARAMETERS | DESCRIPTION | DIRECTION |
|---|---|---|---|
| STPOTS_LT_ABORT | LineNo | REQUEST LINE TEST IS ABORTED IN PLTEST | TO ST |
| STPOTS_LT_CPE | LineNo | REQUEST TO START CPE PRESENCE TEST | TO ST |
| STPOTS_LT_DIALTONE (DELAY TO DIAL TONE TEST) | LineNo | REQUEST TO START DELAY TO DIAL TONE LINE TEST | TO ST |
| STPOTS_LT_EARTHLEAK (EARTH LEAKAGE TEST) | LineNo | REQUEST TO START EARTH LEAKAGE LINE TEST | TO ST |
| STPOTS_LT_HAZVOLTS (HAZARDOUS VOLTAGE TEST) | LineNo | REQUEST TO START HAZARDOUS VOLTAGE TEST | TO ST |
| STPOTS_LT_INFOREPLY | LineNo, RESULT STACK | TEST MESSAGE FROM PLTEST | FROM ST |
| STPOTS_LT_MODE | LineNo, Mode | SETS MODE OF PLTEST FOR LineNo | TO ST |
| STPOTS_LT_STATUS_ENQUIRY | LineNo | REQUEST FOR STATUS OF PLTEST | TO ST |
| STPOTS_LT_STATUS_RESPONSE | LineNo | RESPONSE TO REQUEST FOR STATUS OF PLTEST | FROM ST |
| STPOTS_LT_RESTART | LineNo | FORCES A PLTEST RESET | TO ST |

*FIG. 11*

HANDLING OF SIGNALING INFORMATION WITHIN A TELECOMMUNICATIONS SYSTEM

CROSS REFERENCE TO RELATED APPLICATIONS

The present application claims benefit of Great Britain Application No. 9726621.7 filed Dec. 16, 1997.

TECHNICAL FIELD OF THE INVENTION

The present invention relates generally to telecommunications systems, and more particularly to techniques for handling signaling information in a telecommunications system.

BACKGROUND OF THE INVENTION

In a typical telecommunications system, a subscriber terminal may be located at a subscriber's premises for handling calls to and from that subscriber. One or more lines may be provided from the subscriber terminal for supporting one or more items of telecommunications equipment located at the subscriber's premises. Further, a central terminal may be provided for controlling a number of subscriber terminals, and in particular for managing calls between a subscriber terminal and other components of a telecommunications network.

Typically, for incoming and outgoing calls to and from subscriber terminals, signaling information will be generated to cause the necessary signaling functions to be performed to establish and manage incoming and outgoing calls. This signaling information needs to be correctly managed and routed by the telecommunications system to ensure that the calls are handled correctly.

Nowadays, there is an ever-increasing demand for telecommunications networks to be able to support more users, and this has led to the development of techniques to enable telecommunications systems to support more and more subscriber terminals, and hence more users. This development has also led to an increase in the number of modules, e.g. processing cards, making up the telecommunications system, and an increase in the complexity of the interfaces between these various modules. For example, it may be the case that a plurality of modules all interface directly with a single module (a 'many-to-one' interface).

The above developments have increased the complexity involved in correctly managing and routing the signaling information between these various modules. Hence, it is an object of the present invention to provides an efficient interface mechanism for handling the routing of signaling information between modules of a telecommunications system.

SUMMARY OF THE INVENTION

Viewed from a first aspect, the present invention provides a telecommunications system for connecting to a telecommunications network and for routing telecommunications signals between the telecommunications network and a subscriber terminal of the telecommunications system, the telecommunications system comprising an interface mechanism for passing signaling events over a communications link between modules of the telecommunications system separated by the communications link, the interface mechanism comprising: a network-side object on the telecommunications network side of the communications link for receiving a first signaling event from a first module of the telecommunications system and for generating a first signaling message to represent the first signaling event; a user-side object on the subscriber terminal side of the communications link for receiving a second signaling event from a second module of the telecommunications system separated from said first module via the communications link, and for generating a second signaling message to represent the second signaling event; the network-side object being arranged to pass the first signaling message to the user-side object over the communications link for subsequent processing by modules on the subscriber terminal side of the communications link, and the user-side object being arranged to pass the second signaling message to the network-side object over the communications link for subsequent processing by modules on the telecommunications network side of the communications link.

In accordance with the present invention, a flexible interface mechanism is provided for handling signaling information that needs to be routed between modules of the telecommunications system. In addition to traditional one-to-one interfaces between two modules, the mechanism can also efficiently manage one-to-many and many-to-one interfaces, where a single module may need to interface to a plurality of modules at the other end of a communications link.

In preferred embodiments, the first module and network-side object are provided within a concentrator of the telecommunications system, the concentrator being arranged to transmit signals to and receive signals from the telecommunications network in an unconcentrated format, and to transmit signals to and receive signals from a central terminal of the telecommunications network over the communications link in a concentrated format.

This approach enables the telecommunications system to operate in a Demand Assignment mode of operation, where the total number of subscriber terminals provided by the telecommunications system exceeds the number of traffic-bearing channels available for handling calls.

Preferably, the second module and user-side object are provided within a central terminal of the telecommunications system, the central terminal being arranged to communicate with the subscriber terminal. Hence, in preferred embodiments, a central terminal manages communications with the subscriber terminal, and a concentrator is located between the telecommunications network and the central terminal to perform concentration on incoming signals, and to unconcentrate outgoing signals.

In preferred embodiments, the telecommunications system further comprises a call manager, responsive to an indication that a call is being initiated to generate as said first module a call object to handle signaling events associated with that call. Hence, in such embodiments, a separate call object is generated for each call.

For an incoming call, the call object is preferably arranged to receive a setup signaling event, and to cause the network-side object to generate a setup message including as a parameter an identifier of a telecommunications line of the subscriber terminal to which the incoming call is directed, the user-side object being arranged to decode the setup message to determine the setup signaling event, and to transfer the setup signaling event to the second module.

Further, in preferred embodiments, the second module is arranged to cause the second signaling event to be transferred to the subscriber terminal, the subscriber terminal being arranged to process the second signaling event to cause an item of telecommunications equipment connected to the telecommunications line to generate an incoming call indication.

The subscriber terminal may use either wired or wireless communications to communicate with other elements of the telecommunications system. However, in preferred embodiments, the subscriber terminal is arranged to receive and transmit telecommunications signals via a wireless link, and the call object is arranged upon receipt of the setup signaling event to invoke modules of the telecommunications system to allocate a radio slot for establishing the wireless link for the incoming call.

In preferred embodiments, the second module is a signaling port within a central terminal of the telecommunications system, the signaling port being arranged, upon receipt of the first signaling event to cause the first signaling event to be transmitted to the subscriber terminal.

When an incoming call is accepted at the subscriber terminal, then in preferred embodiments an off-hook signaling event indicating that the incoming call is connected is generated to cause an off-hook indication to be transmitted to the second module, the second module being responsive to that off-hook indication to instruct the user-side object to generate a second message identifying that the incoming call is connected.

For an outgoing call from the subscriber terminal, the second module is preferably arranged to receive a setup signaling event and to cause the user-side object to generate a setup message including as a parameter an identifier of a telecommunications line of the subscriber terminal from which the outgoing call is originated, the network-side object being arranged to decode the setup message to determine the setup signaling event, and to transfer the setup signaling event to the first module.

When the outgoing call is accepted by the telecommunications network, then in preferred embodiments a connect signaling event indicating that the outgoing call is connected is received by the first module, and the first module is responsive to said connect signaling event to cause the network-side object to generate a connect message to represent the connect signaling event, the user-side object being arranged to decode the connect message to produce a signaling event for transferring to the subscriber terminal, confirming that the outgoing call is connected.

In embodiments employing a concentrator, the concentrator preferably further comprises an exchange port arranged to transmit signals to and receive signals from the telecommunications network, the exchange port being separated from the first module by a backplane, and a second network-side object and a second user-side object being provided at respective ends of the backplane to handle the communication of signaling events over the backplane.

Viewed from a second aspect, the present invention provides a concentrator for a telecommunications system according to the first aspect of the present invention, the concentrator comprising: a first module; a network-side object providing an interface with a communications link between the concentrator and other elements of the telecommunications network, the network side object being arranged to receive a first signaling event from the first module and to generate a first signaling message to represent the first signaling event for transmission over the communications link; the network-side object further being arranged to receive a second signaling message over the communications link, and to decode that second signaling message for subsequent processing by the concentrator.

Viewed from a third aspect, the present invention provides a central terminal for a telecommunications system according to the first aspect of the present invention, the central terminal comprising: a second module; a user-side object providing an interface with a communications link between the central terminal and other elements of the telecommunications network, the user-side object being arranged to receive a second signaling event from the second module and to generate a second signaling message to represent the second signaling event for transmission over the communications link; the user-side object further being arranged to receive a first signaling message over the communications link, and to decode that first signaling message for subsequent processing by the central terminal.

Viewed from a fourth aspect, the present invention provides a method of handling signaling events in a telecommunications system arranged to be connected to a telecommunications network and to route telecommunications signals between the telecommunications network and a subscriber terminal of the telecommunications system, the method comprising the steps of: providing a communications link between modules of the telecommunications system; arranging a network-side object on the telecommunications network side of the communications link to receive a first signaling event from a first module of the telecommunications system; employing the network-side object to generate a first signaling message to represent the first signaling event; passing the first signaling message over the communications link for subsequent processing by modules on the subscriber terminal side of the communications link; arranging a user-side object on the subscriber terminal side of the communications link to receive a second signaling event from a second module of the telecommunications system separated from said first module via the communications link; employing the user-side object to generate a second signaling message to represent the second signaling event; and passing the second signaling message over the communications link for subsequent processing by modules on the telecommunications network side of the communications link.

By this approach, a flexible interface mechanism is provided for handling signaling information that needs to be routed between modules of the telecommunications system.

BRIEF DESCRIPTION OF THE DRAWINGS

The present invention will be described further, by way of example only, with reference to a preferred embodiment thereof as illustrated in the accompanying drawings, in which:

FIG. 10 is a table listing the messages contained within the message set used in preferred embodiments to represent signaling events communicated between the central terminal and subscriber terminal; and FIG. 11 is a table listing the messages contained within the message set used in preferred embodiments to represent testing events communicated between the central terminal and subscriber terminal.

DETAILED DESCRIPTION OF THE INVENTION

The present invention may be employed in any type of telecommunications system, for example a wired telecommunications system, or a wireless telecommunications system. Further, the present invention may be used to control signaling of any appropriate type of telecommunications signal, for example a telephone signal, a video signal, or data signals such as those used for transmitting data over the Internet, and in order to support new technologies such as broadband and video-on-demand technologies. However, for the purpose of describing a preferred embodiment of the present invention, a wireless telecommunications system will be considered that is used for handling telephony signals, such as POTS (Plain Old Telephony System) signals.

Before describing a preferred embodiment of the present invention, an example of such a wireless telecommunications system in which the present invention may be employed will first be discussed with reference to FIGS. 1 to 4.

Figure 1:
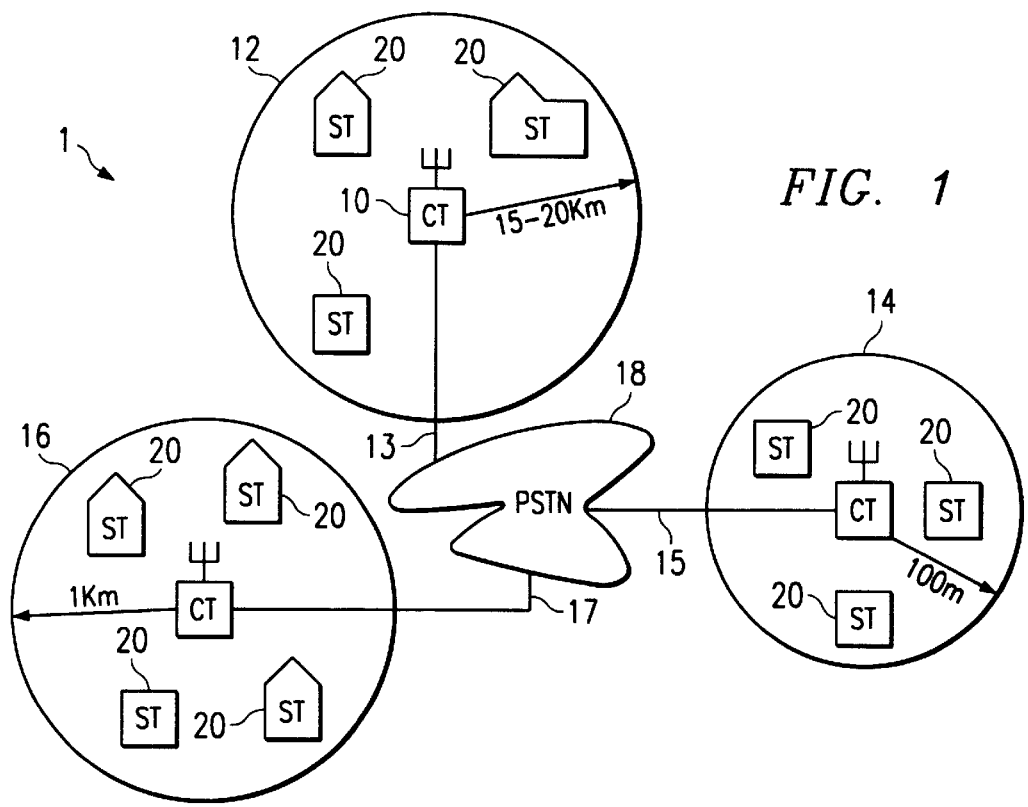
FIG. 1 is a schematic overview of an example of a wireless telecommunications system in which the present invention may be employed.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing radio links between subscriber terminals 20 at fixed locations within a service area (e.g., 12, 14, 16) and the central terminal 10 for that service area. These wireless radio links are established over predetermined frequency channels, a frequency channel typically consisting of one frequency for uplink signals from a subscriber terminal to the central terminal, and another frequency for downlink signals from the central terminal to the subscriber terminal.

Due to bandwidth constraints, it is not practical for each individual subscriber terminal to have its own dedicated frequency channel for communicating with a central terminal. Hence, techniques have been developed to enable data items relating to different wireless links (i.e. different ST-CT communications) to be transmitted simultaneously on the same frequency channel without interfering with each other. One such technique involves the use of a "Code Division Multiple Access" (CDMA) technique whereby a set of orthogonal codes may be applied to the data to be transmitted on a particular frequency channel, data items relating to different wireless links being combined with different orthogonal codes from the set. Signals to which an orthogonal code has been applied can be considered as being transmitted over a corresponding orthogonal channel within a particular frequency channel.

One way of operating such a wireless telecommunications system is in a fixed assignment mode, where a particular ST is directly associated with a particular orthogonal channel of a particular frequency channel. Calls to and from items of telecommunications equipment connected to that ST will always be handled by that orthogonal channel on that particular frequency channel, the orthogonal channel always being available and dedicated to that particular ST.

However, as the number of users of telecommunications networks increases, so there is an ever increasing demand for such networks to be able to support more users. To increase the number of users that may be supported by a single central terminal, an alternative way of operating such a wireless telecommunications system is in a Demand Assignment mode, in which a larger number of STs are associated with the central terminal than the number of traffic-bearing orthogonal channels available. These orthogonal channels are then assigned to particular STs on demand as needed. This approach means that far more STs can be supported by a single central terminal than is possible in a fixed assignment mode, the exact number supported depending on the level of dial tone service that the service provider desires. In preferred embodiments of the present invention, each subscriber terminal 20 is provided with a demand-based access to its central terminal 10, so that the number of subscribers which can be serviced exceeds the number of available wireless links.

Figure 2:
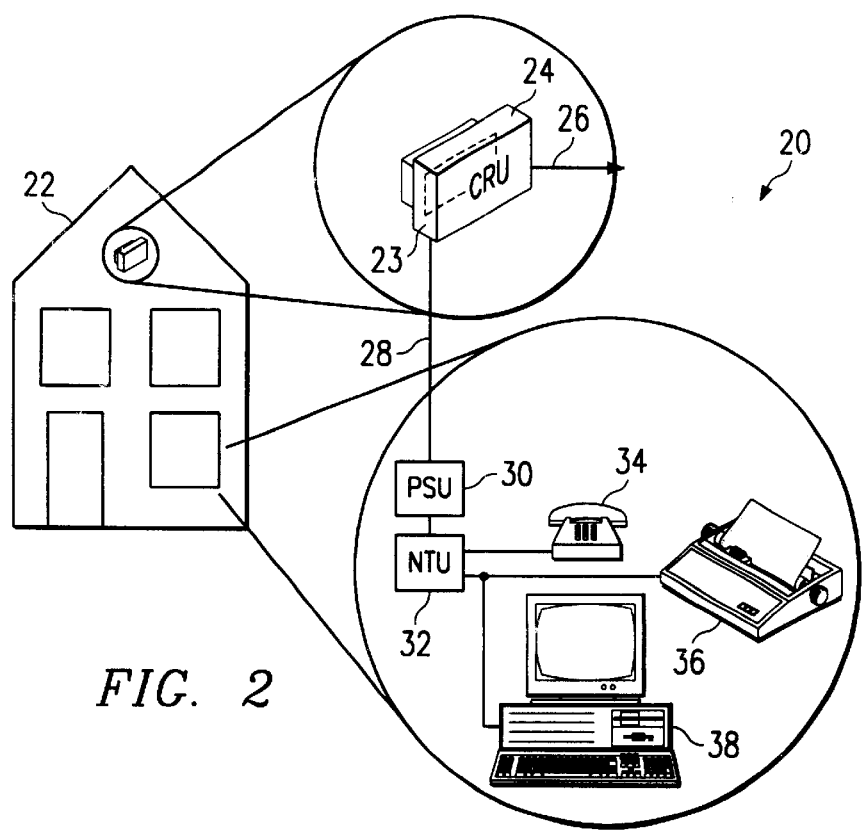
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 can support multiple lines, so that several subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
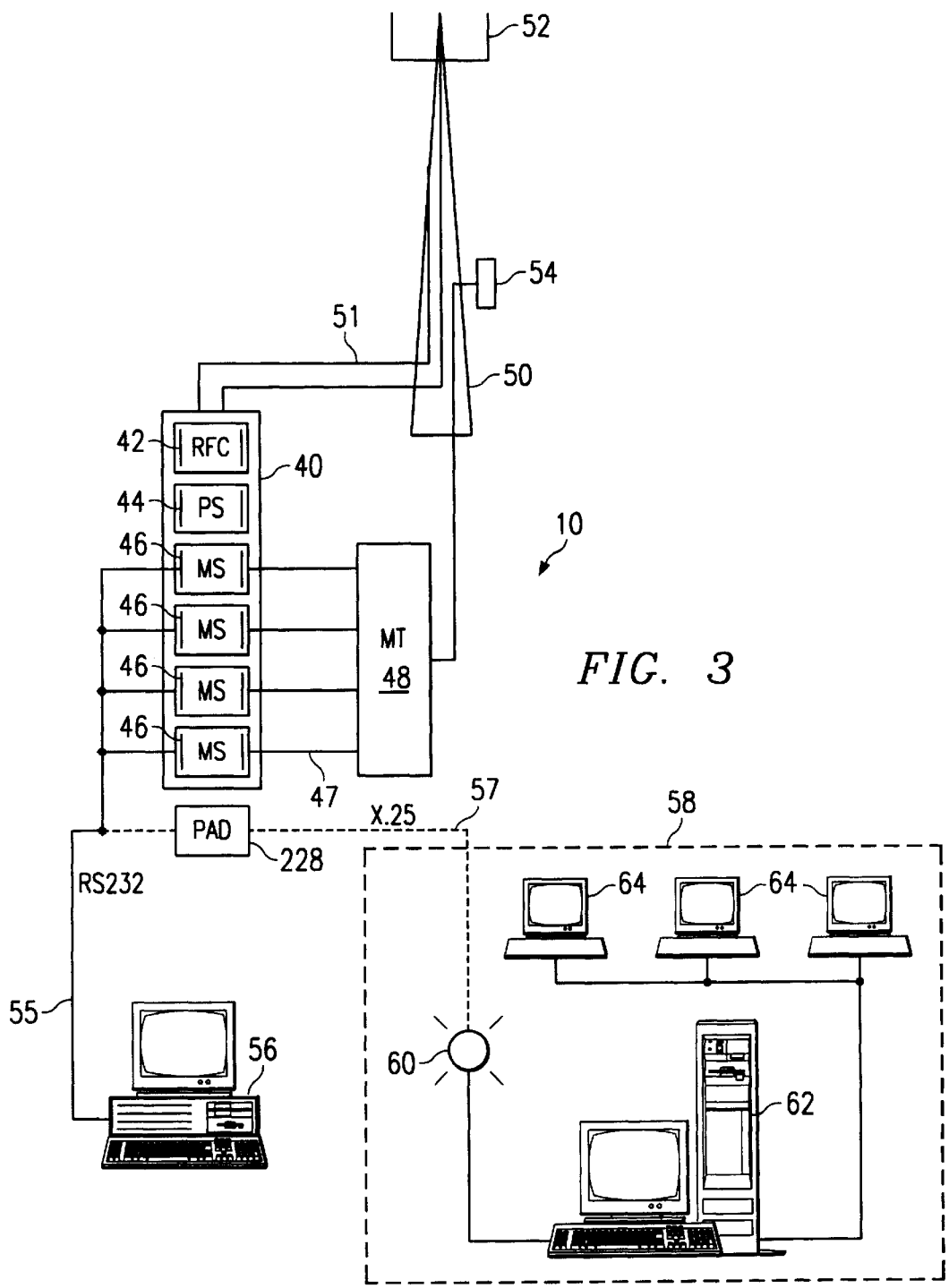
FIG. 3 is a schematic illustration of an example of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the modem shelves 46 to operate in parallel. If 'n' modem shelves are provided, then the RF combiner shelf 42 combines and amplifies the power of 'n' transmit signals, each transmit signal being from a respective one of the 'n' modem shelves, and amplifies and splits received signals 'n' way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, such as an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localization of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
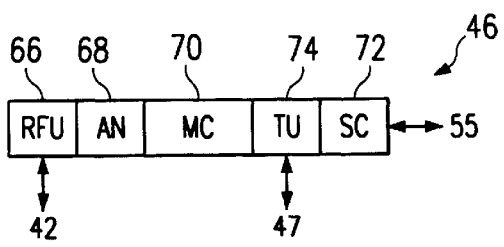
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This may include ½ rate convolution coding and ×16 spreading with "Code Division Multiplexed Access" (CDMA) codes on the transmit signals, and synchronization recovery, de-spreading and error correction on the receive signals. Each modem card 70 in the present example has two modems, and in preferred embodiments there are eight modem cards per shelf, and so sixteen modems per shelf. However, in order to incorporate redundancy so that a modem may be substituted in a subscriber link when a fault occurs, only 15 modems on a single modem shelf 46 are generally used. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signaling of telephony information to the subscriber terminals via one of 15 of the 16 modems. Further, each modem shelf 46 includes a shelf controller 72 that is used to manage the operation of the whole of the modem shelf and its daughter network sub-elements (NSEs). The shelf controller (SC) is provided with a RS232 serial port for connection to the site controller 56 or to the pad 228. The shelf controller communicates control and data information via a backplane asynchronous bus directly with the other elements of the modem shelf. Other network sub-elements are connected via the modem cards.

Figure 4:
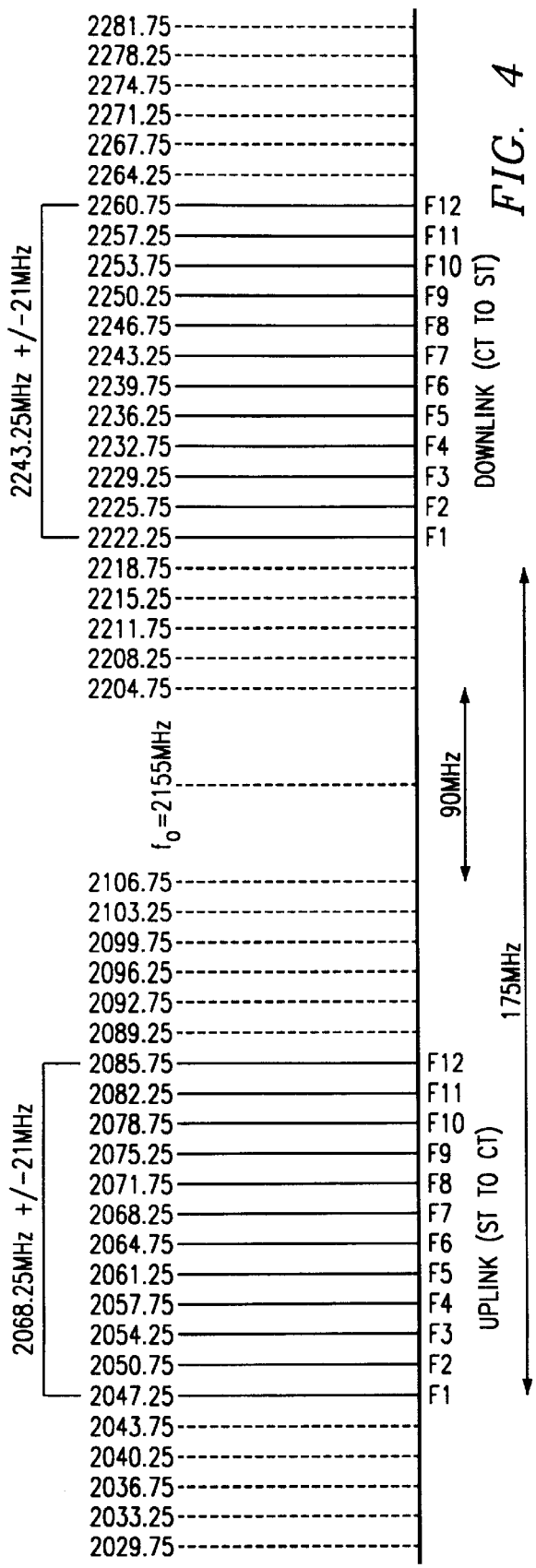
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centered about 2155 MHz. The spacing between the receive and transmit channels exceeds the required minimum spacing of 70 MHz.

In the present example, each modem shelf is arranged to support 1 frequency channel (i.e. one uplink frequency plus the corresponding downlink frequency), with techniques such as 'Code Division Multiplexed Access' (CDMA) being used to enable a plurality of wireless links to subscriber terminals to be simultaneously supported on a plurality of orthogonal channels within each frequency channel.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10. This is discussed in more detail in GB-A-2,301,751, which also provides further details on CDMA encoding/decoding, and on the signal processing stages employed in the subscriber terminals and central terminal to manage CDMA communications between them.

The above description has provided an overview of a suitable wireless telecommunications system in which the present invention may be employed. The techniques used in preferred embodiments of the present invention to manage calls to or from subscriber terminals of the wireless telecommunications system will now be discussed.

As discussed earlier, in a Demand Assignment mode of operation, far more STs can be supported than there are traffic bearing channels to handle wireless links with those STs, the exact number supported depending on the level of dial tone service that the service provider desires.

However, the use of a Demand Assignment mode complicates the interface between the central terminal and the switch of a public switched telephone network (PSTN). On the switch side interface, the CT must provide services to the switch as though all of the subscribers are connected with direct service even though they may not be actually acquired to a radio frequency channel. Regardless of whether the ST is acquired or not to the switch, all of the subscribers must have a presence at the interface to the switch. Without some form of concentration, it is clear that a large number of interfaces to the switch would need to be provided. However, most PSTN switches still use unconcentrated interfaces, for example V5.1 or CAS, and only relatively few use concentrated interfaces, such as TR303 or V5.2.

To avoid each central terminal having to provide such a large number of interfaces to the switch, it is proposed to use an access concentrator, which transmits signals to, and receives signals from, the central terminal using concentrated interfaces, but maintains an unconcentrated interface to the switch, protocol conversion and mapping functions being employed within the access concentrator to convert signals from a concentrated format to an unconcentrated format, and vice versa. Such an access concentrator is illustrated in FIG. 5, which illustrates elements of the access concentrator and central terminal used to manage calls.

Figure 5:
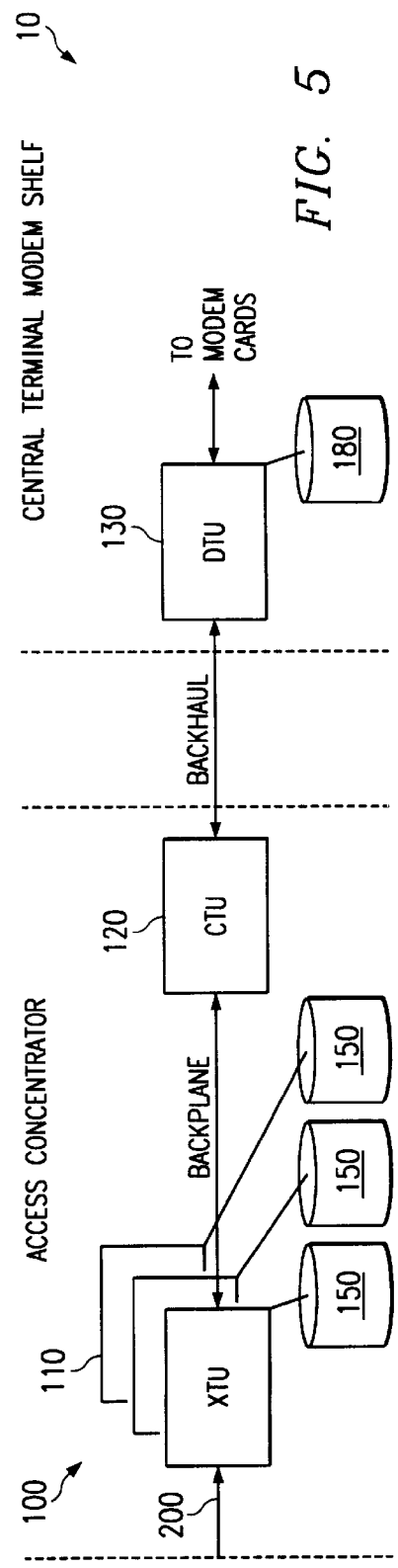
FIG. 5 is a block diagram showing elements of an access concentrator and central terminal used to manage calls to and from subscriber terminals in accordance with preferred embodiments of the present invention.

It will be appreciated by those skilled in the art that, although the access concentrator 100 is illustrated in FIG. 5 as a separate unit to the central terminal 10, and indeed this is the preferred implementation, it is also possible that the functions of the access concentrator could be provided within the central terminal 10 in situations where that was deemed appropriate.

As illustrated in FIG. 5, the Access Concentrator 100 has a number of tributary units 110, hereafter referred to as XTUs (Exchange (facing) Tributary Units), which provide an unconcentrated interface to the switch of a telecommunications network. When an incoming call is received over path 200 from the switch of a telecommunications network, then the XTU 110 receiving that call is arranged to determine from information associated with that incoming call which subscriber terminal line the incoming call is destined for, and to then use that information to access a database 150 associated with that XTU 110 in order to retrieve all of the necessary information about that subscriber terminal line to enable the call to be routed through the access concentrator to the central terminal and then over a wireless link to the subscriber terminal.

In preferred embodiments, the XTUs 110 are connected to the switch of the telecommunications network via E1 lines. The number of E1 lines required will depend on the number of subscriber terminal lines supported by the wireless telecommunications system, each subscriber terminal line having a dedicated time slot on a predetermined one of the E1 connections.

Once the necessary information has been retrieved by the XTU 110 from the database 150, then the XTU 110 is arranged to contact the tributary unit 120 within the access concentrator 100, hereafter referred to as the CTU 120 (Concentrator Tributary Unit), to request a call manager within the CTU 120 to determine a suitable path for directing the call over the backplane between the XTU 110 and the CTU 120, over the backhaul between the access concentrator 100 and the central terminal 10, and over the wireless link between the central terminal and the subscriber terminal to which the call is destined. The mechanism used by the call manager in preferred embodiments to determine the path for routing the call between the access concentrator, the central terminal and the subscriber terminal will be discussed later with reference to FIG. 6. Further, a detailed discussion of this technique is provided in UK Patent Application No. 9712168.5 filed on Jun. 11, 1997.

However, in brief, the call manager preferably establishes a call object to represent the call, and then stores the information retrieved from the database 150 by the XTU as attributes of that call object. Further, the call manager preferably employs certain elements within the access concentrator and the central terminal to determine whether there is a radio slot available for carrying the call between the central terminal and the subscriber terminal. Herein, the term "radio slot" refers to the bandwidth elements into which each frequency channel is sub-divided, these radio slots being assigned to particular calls as required.

Once a radio slot has been allocated for the call, the call manager within the CTU 120 causes the addressed subscriber terminal to be invited to acquire the wireless link on that radio slot. Once the subscriber terminal has acquired the wireless link on the correct radio slot, then the call manager causes bearer time slots to be allocated on the links of the concentrated backhaul interface between the access concentrator 100 and the central terminal 10, and on the concentrated backplane between the XTU 110 and the CTU 120 in the access concentrator 100.

The backplane and the backhaul are referred to as "concentrated", because the number of time slots provided are less than the actual number of subscriber terminals supported by the system. Hence, a bearer time slot is allocated dynamically as and when required. Hence, unlike the E1 connections between the XTUs 110 and the exchange switch, where data relating to a particular subscriber terminal line will always appear on a particular time slot of a particular E1 line, the data for a particular subscriber terminal line may appear on any free bearer time slots on the backplane and the backhaul, since these time slots are allocated dynamically at the time the call is initiated.

Once the above process has taken place, then the call can be routed from the XTU 110 over the backplane to the CTU 120, and from there over the backhaul to a tributary unit 130 within one of the modem shelves of the central terminal with which the subscriber terminal has established the wireless link, this tributary unit 130 being referred to as a DTU 130 (Demand Assignment Tributary Unit). As discussed earlier with reference to FIG. 3a, the data is then routed via the modem card 70, an analogue card 68, a transmit/receive RF Unit 66, and then via the RF combiner shelf 42 before being transmitted from the central terminal antenna to the subscriber terminal over the wireless link.

The above description has discussed the general technique used to route an incoming call from a switch of a telecommunications network to a particular subscriber terminal. A similar process is employed in the reverse direction for outgoing calls from a subscriber terminal to the switch. In this instance, when the subscriber terminal contacts the central terminal to establish an outgoing call, then once the radio link is established the DTU 130 within the appropriate central terminal modem shelf accesses the database 180 to retrieve the necessary information (e.g. E1 time slot ID) to enable the call to be routed via the backhaul and the backplane to the correct E1 line to the switch. The information retrieved is then transmitted with the set up message to the CTU 120 to enable a call object to be created.

Figure 6:
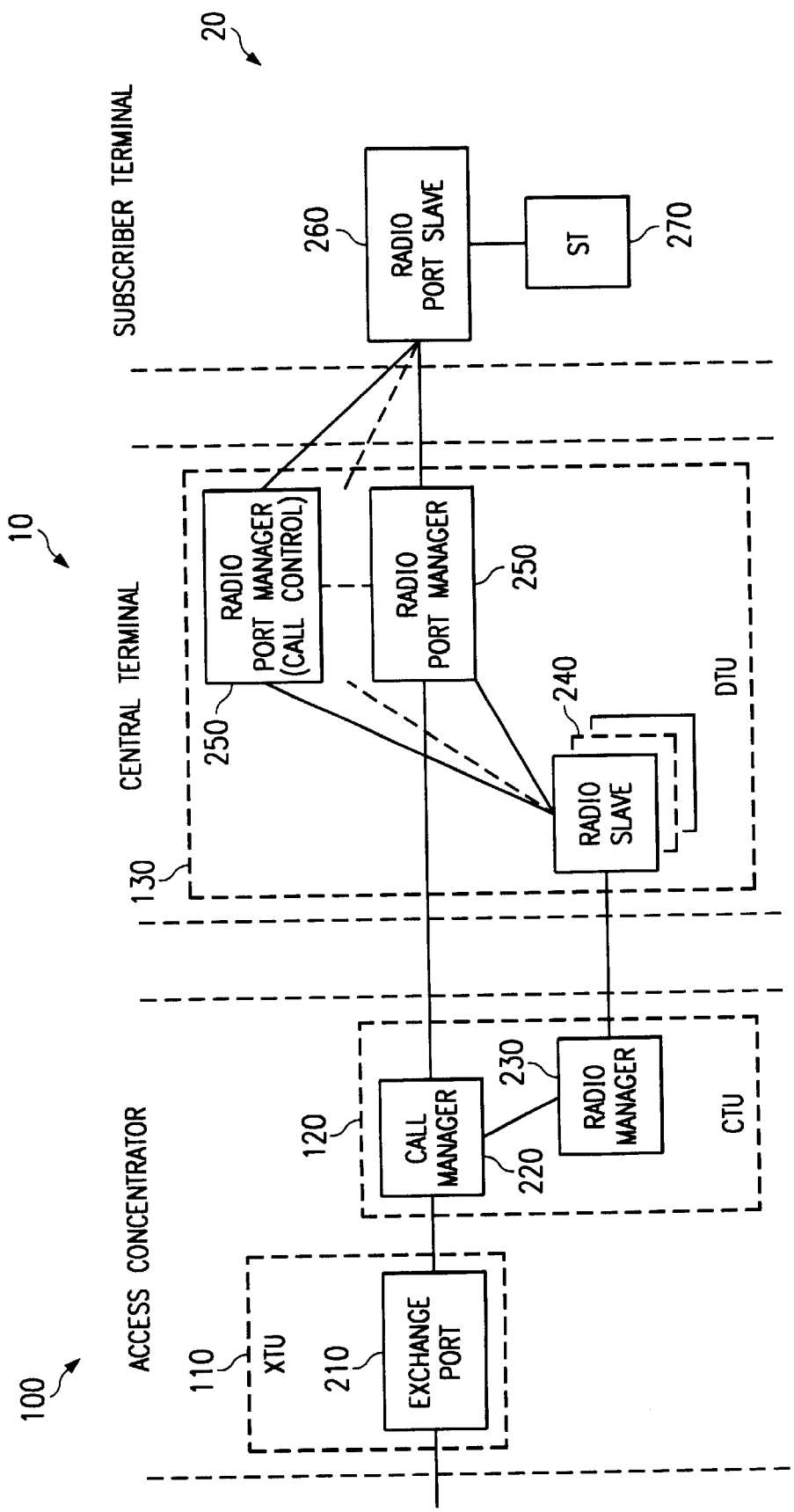
FIG. 6 is a block diagram illustrating the main elements employed in preferred embodiments of the present invention to route calls to and from a subscriber terminal.

FIG. 6 illustrates in more detail the elements used to route calls from the switch to the subscriber terminal, and vice versa. For an incoming call, the first step is that the incoming call is received by the exchange port 210 contained within the XTU 110 of the access concentrator, and the call manager 220 within the CTU 120 is then notified of the call.

The call manager 220 then sends a message to the radio manager 230, requesting the radio manager 230 to identify a radio slot to be used to carry the call. In the central terminal 10, a number of radio slaves 240 are provided within the DTU 130, in preferred embodiments there being one radio slave 240 for each modem shelf, and hence each frequency channel, provided by the central terminal. The radio manager 230 identifies a radio slot by asking each of the radio slaves 240 in the shelves capable of carrying a call to the addressed subscriber terminal for a radio slot. Each radio slave 240 is asked in turn, until a suitable radio slot is found, the addressed radio slave 240 sending a message to the radio manager 230 informing the radio manager 230 of a suitable radio slot that may be used for the call if such a radio slot exists within the frequency channel managed by that radio slave.

When the radio slave 240 indicates to the radio manager 230 a radio slot that is available for the call, the radio slave 240 also contacts the radio port manager associated with the selected radio slot. In preferred embodiments, there is one radio port manager 250 provided for each radio slot.

Upon receipt of the message from the radio slave 240, the radio port manager 250 is arranged to configure itself such that it is able to receive an acquisition request message from a subscriber terminal on its associated radio slot.

Once the radio manager 230 has received from the radio slave 240 the identification of the radio slot to be used to carry the call, it informs the call manager 220 that a radio slot has been determined. The call manager 220 then instructs the radio manager 230 to invite the addressed subscriber terminal to acquire the wireless link on the selected radio slot. The radio manager 230 then informs all of the radio slaves 240 associated with frequency channels that may be used to contact the subscriber terminal, and these radio slaves are arranged to instruct all of the radio port managers 250 associated with the radio slots of those frequency channels to cause those radio port managers to transmit an invitation message to the subscriber terminal 20.

One of the orthogonal channels within each frequency channel is preferably designated as a call control channel, and hence one of the radio port managers 250 will be associated with that call control channel.

When a subscriber terminal is not involved in a call on a particular traffic channel, it is preferably arranged to listen to the call control channel, this enabling management messages to be sent to the subscriber terminal, and also, in accordance with preferred embodiments of the present invention, enabling the subscriber terminal to receive information about incoming calls destined for that subscriber terminal.

Hence, generally speaking, the transmission of the invitation message on the call control channel by the associated radio port manager 250 will be sufficient to inform the addressed subscriber terminal 20 of the radio slot that it should acquire in order to establish a wireless link between the central terminal and the subscriber terminal for an incoming call. However, in some cases, the addressed subscriber terminal will already be involved in a call on another traffic channel (or indeed in a communication with the CT for management purposes, such as the download of software), and hence will no longer be listening to the call control channel. Nevertheless, since more than one item of telecommunications equipment can be supported by an individual subscriber terminal, it is still possible that this incoming call can be connected, despite one item of telecommunications equipment already being involved in a call. Hence, in preferred embodiments all of the radio port managers associated with radio slots that can be used to contact the addressed subscriber terminal are arranged to send the invitation message, this ensuring that the subscriber terminal 20 will receive the invitation message and act appropriately.

The invitation messages transmitted by the radio port managers 250 are received by a radio port slave 260 within the subscriber terminal 20. Generally, there will be one radio port slave 260 per subscriber terminal 20. The radio port slave 260 will then inform the ST logic 270 that a request to acquire a particular radio slot has been received. The ST logic 270 in FIG. 6 encapsulates the functionality contained in the ST's microcontroller. The ST logic 270 will then return an access request message to the radio port slave 260 instructing the radio port slave to issue an acquisition request message to the radio port manager 250 within the central terminal 10 associated with the identified radio slot. Once this has been done, the radio port slave 260 will enter a state in which it waits to be granted access to the wireless link.

Once the radio port manager 250 associated with the allocated radio slot has received the acquisition request message, it checks that the acquisition request message has been received from the correct subscriber terminal 20, and then sends a message to the radio port slave 260 granting the subscriber terminal access to the radio slot, and will also send an acquisition acknowledge message via the radio slave 240 and the radio manager 230, to the call manager 220.

At this point, the radio manager 230 will allocate bearer time slots on the links of the concentrated interface between the access concentrator 100 and the central terminal 10. In preferred embodiments, the radio manager stores fixed mappings between the radio slots and the bearer time slots allocated by the radio manager, such that once the radio manager knows the radio slot acquired by the subscriber terminal, it will allocate a predetermined bearer time slot. Once this has been done, the incoming call can be connected, and the call can then proceed.

For outgoing calls, the following procedure is preferably employed. Periodically, the radio port manager 250 associated with the call control channel is arranged to broadcast a free list to subscriber terminals 20 indicating those radio slots which are available for acquisition by the subscriber terminals for outgoing calls. The radio port managers 250 associated with the radio slots identified in the free list are notified, so that they can configure themselves to be in an available state, in which they are ready to receive acquisition request messages from subscriber terminals. When the radio port slave 260 receives the free list broadcast on the call control channel it notifies the subscriber terminal logic 270.

If the subscriber terminal logic 270 then detects an off hook condition, indicating that a user of a connected item of telecommunications equipment wishes to make an outgoing call, then the subscriber terminal logic 270 will inform the radio port slave 260 of a radio slot that it has selected from the free list, and which is to be used to establish the outgoing call.

The radio port slave 260 will then notify the radio port manager 250 associated with the selected radio slot by issuing an acquisition request message to the radio port manager. The acquisition request message identifies the ST wishing to make the outgoing call. The radio port manager 250 will then inform the radio manager 230 via the radio slave 240 of the acquisition of the radio slot by the subscriber terminal 20. Further, the radio port manager 250 will issue an access grant message to the radio port slave 260.

The ST logic 270 then sends the off hook message to the radio port slave 260, which passes it on to the call manager 220 via the radio port manager 250. As with the incoming call case, the radio manager 230 then allocates a bearer channel to carry the call between the Access Concentrator 100 and the central terminal 10. The outgoing call can then be connected.

Figure 7:
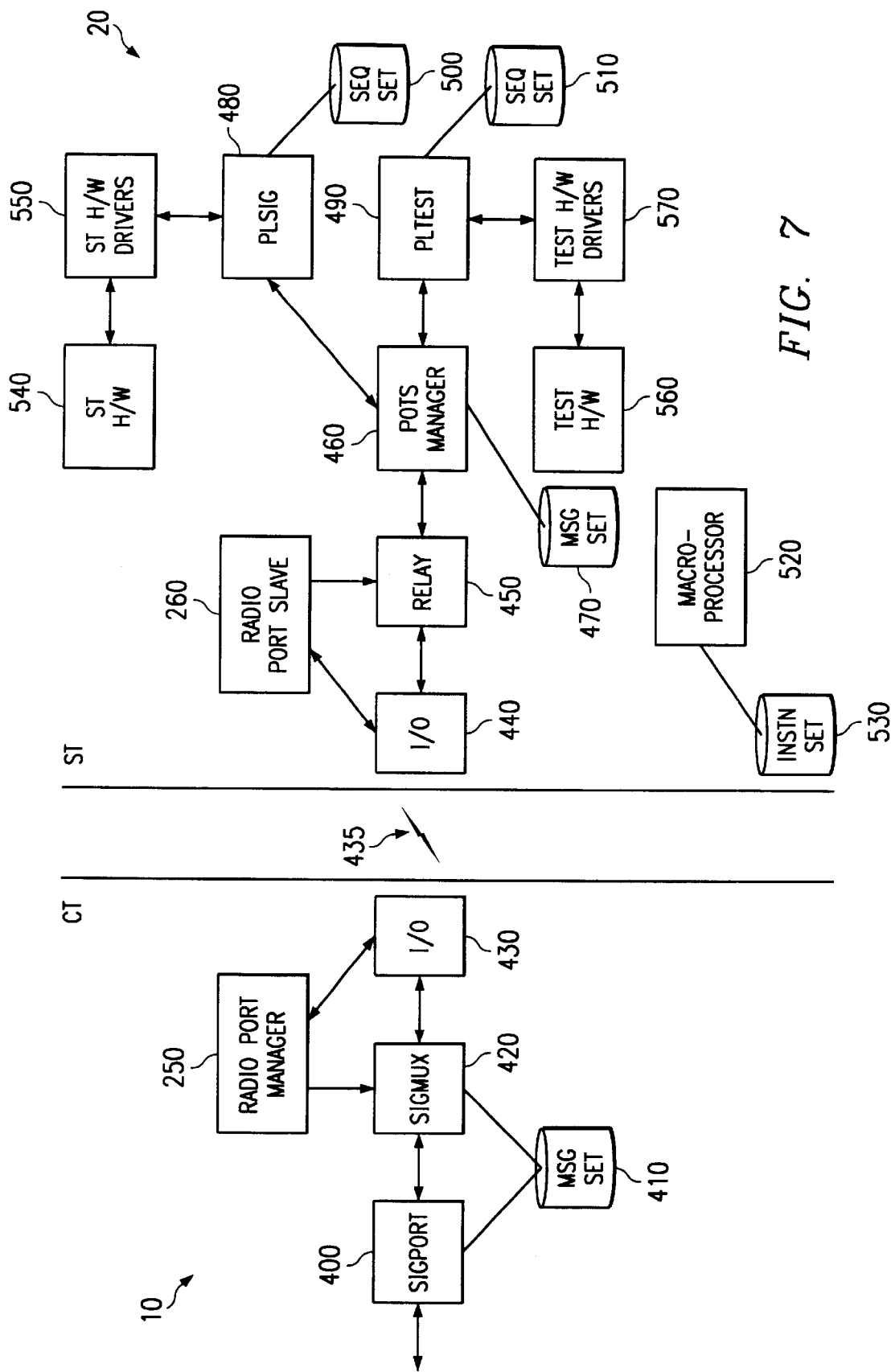
FIG. 7 is a block diagram showing the main components used to handle signaling procedures within the subscriber terminal for incoming and outgoing calls.

Having described the techniques used in preferred embodiments of the present invention to allocate radio slots to incoming and outgoing calls for establishing a wireless link for those incoming and outgoing calls, the techniques used to handle the signaling procedures for those incoming and outgoing calls will now be discussed in detail with reference to FIG. 7, which is a block diagram illustrating the main elements employed in preferred embodiments of the present invention to perform such signaling functions.

During the establishment of a wireless link on a particular radio slot, the radio port manager 250 associated with that radio slot will communicate with the radio port slave 260 of the subscriber terminal via the input/output (I/O) ports 430 and 440. During this time, the signaling multiplexer (SIGMUX) 420 within the central terminal (one SIGMUX is provided for each subscriber terminal supported by the central terminal) and the relay 450 within the subscriber terminal will be disabled to avoid any signaling information being passed via the I/O ports 430, 440 between the central terminal and the subscriber terminal.

However, once the wireless link has been established, the radio port manager 150 will send a signal to the SIGMUX 420 to enable that SIGMUX to multiplex signaling messages for transmission over the wireless link to the subscriber terminal 20. Further, the radio port slave 160 will send a signal to the relay 450 to enable that relay to pass signaling information between the I/O port 440 and the POTS manager 460.

Within the central terminal 10, a signaling port (SIGPORT) 400 is provided for each subscriber line that can be supported within the subscriber terminal. Hence, if subscriber terminal 20 can support 16 lines, then 16 SIGPORTs will be associated with the corresponding SIGMUX 420 in the central terminal. Each SIGPORT 400 is arranged to receive signaling events destined for the corresponding line of the subscriber terminal from a number of other elements within the central terminal, these signaling events indicating to the SIGPORT 400 that a signaling message needs to be generated for transmission to the subscriber terminal 20. The SIGPORT 400 has access to a message set 410 containing a list of all the messages that may be created by the SIGPORT 400 to represent the signaling events received from other elements of the central terminal. In preferred embodiments, this message set 410 comprising a core set of messages which may be used to invoke any of the range of signaling procedures, or "sequences", that may need to be performed by the ST 20.

Once the SIGPORT has determined, with reference to the message set 410, which message should be transmitted to the ST 20, then the SIGPORT 400 generates that message and passes it to the SIGMUX 420, which combines the message into the downlink signal to be transmitted from the CT 10 to the ST 20. This downlink signal is then passed to the I/O port 430 for transmission over the wireless link 435 to the I/O port 440 within the ST.

The SIGPORT 400 is in preferred embodiments also arranged to receive test events that may be issued by a test engineer to perform line testing functions and the like. In preferred embodiments, the message set 410 also includes a core set of test messages used to represent these test events. When the SIGPORT 400 determines that a received event is a test event, for example, by reference to the attributes of the test event, then it references the message set 410 to determine the appropriate test message to represent that test event, generates that test message and passes it to the SIGMUX 420 for combining into the downlink signal to be transmitted from the CT 10 to the ST 20. As with signaling messages, this downlink signal is then passed to the I/O port 430 for transmission over the wireless link 435 to the I/O port 440 within the ST.

As discussed earlier, due to the use of orthogonal codes and the like, the ST 20 I/O port 440 will only recognise that portion of the downlink signal destined for that particular ST 20. Further, since, by this stage, the radio port slave 260 will have enabled the relay 450, then the relay 450 is able to transfer any signaling or testing messages received by the I/O port 440 to the POTS manager 460.

In preferred embodiments of the present invention, a POTS Line Signaling (PLSIG) processor 480 is provided for each POTS line to an item of telecommunications equipment connected to the ST 20. Further, one POTS Line Testing (PLTEST) processor 490 is provided per ST 20. The POTS manager 460 has access to a message set 470, this message set preferably containing an identical set of messages to the messages included within the message set 410 of the central terminal 10. By referencing this message set 470, the POTS manager 460 is able to decode the received message to determine the signaling or testing event represented by that message. In preferred embodiments, the message contains an attribute identifying the ST line number which the message relates to. If the message represents a test event, then that event is simply forwarded to the PLTEST processor 490. However, since there is preferably one PLSIG processor 480 for each ST POTS equipment line, then for a signaling event the line number attribute is used by the POTS manager 460 to determine which particular PLSIG processor 480 the signaling event is directed to.

Hence, having reference to the message set 470, and information within the message such as the line number attribute, the POTS manager 460 is able to determine whether the message represents a signaling event destined for a PLSIG processor 480, or a test event destined for the PLTEST processor 490, and, if the message represents a signaling event, which particular PLSIG processor 480 the signaling event is destined for. Hence, the POTS manager 460 is arranged to route signaling events to the appropriate PLSIG processor 480, or to route test events to the PLTEST processor 490.

Assuming the message represents a signaling event, then the PLSIG processor 480 corresponding to the particular POTS line to which the event is directed will receive that signaling event. Each PLSIG processor 480 contains "context" information identifying the particular PLSIG processor, and also the state of the POTS line associated with the PLSIG processor. Using this context information, the PLSIG processor 480 is arranged to reference a sequence set 500 containing a set of signaling sequences that may be performed in connection with the particular ST POTS line. This sequence set 500 may be defined globally for any line within the ST 20, or, alternatively, the actual sequence set 500 may be defined on a per line basis. In this latter case, each PLSIG processor 480 within the ST will be arranged to access a different sequence set 500.

The sequence set 500 is preferably a lookup table which lists a set of signaling events, and, for each event, identifies a signaling sequence which should be performed upon receipt of that event. However, in preferred embodiments, the actual correspondence between events and sequences may be varied dependent on the state information stored within the PLSIG processor 480. Hence, in effect, the sequence set 500 can comprise a number of lookup tables, one for each different state that may be stored by the PLSIG processor 480. In such cases, the PLSIG processor 480 is arranged to use the context information stored within it, and the signaling event received from the POTS manager 460, in order to reference the sequence set 500, identify the appropriate lookup table within the sequence set 500, and then retrieve a pointer to the sequence identified by the lookup table as corresponding to the signaling event.

Once this process has been performed, the PLSIG processor 480 returns the current context information, and a pointer to the sequence identified via the PLSIG processor 480, to the POTS manager 460.

The POTS manager 460 is arranged to own a macroprocessor 520, which has access to an instruction set 530 in order to execute any of the sequences stored within the sequence set 500. Upon receipt of the sequence pointer and context information from the PLSIG processor 480, the POTS manager 460 is arranged to allocate the macroprocessor 520 to that PLSIG processor 480, and to pass the macroprocessor 520 the sequence pointer and context information. The macroprocessor 520 will then retrieve the particular identified sequence from the sequence set 500, and will identify the instructions set out in that particular sequence. Then, the macroprocessor 520 will execute the sequence by retrieving from the instruction set 530 the instructions forming the sequence, and executing those instructions in the appropriate order. Dependent on the sequence involved, this may result in certain signaling events being sent from the PLSIG processor 480 to the POTS manager 460 to cause a message to be generated for passing via the relay 450 and the I/O port 440 for transmission over the wireless link 435 to the central terminal.

In addition to receiving events directly from the POTS manager 460, each PLSIG processor 480 may also receive signaling events from one or more ST hardware drivers 550 that are connected to particular items of ST hardware 540. Hence, the ST hardware drivers 550 may detect conditions such as the ST hardware 540 going "off-hook", digits being entered by a user of the ST hardware 540, etc, and may respond to these events by generating signaling events for transmission to the PLSIG processor 480. As before, these events will cause the PLSIG processor 480 to perform a lookup process within the sequence set 500 in order to retrieve a pointer for a particular sequence that needs to be executed within the subscriber terminal as a result of those events. This information will then be passed to the POTS manager 460, which will allocate the macroprocessor 520 to the PLSIG processor 480, and the particular sequence will then be executed by the macroprocessor 520.

As mentioned earlier, the POTS manager 460 may also receive test messages from the central terminal, these messages being used to invoke particular test sequences, either on a periodic or random basis, so as to test that the POTS lines are operating correctly. Upon receipt of such messages, the POTS manager 460 will reference the message set 470 in order to decode the message, and upon determining that a message represents a test event, will forward that test event to the PLTEST processor 490. As mentioned earlier, in preferred embodiments, there is only one PLTEST processor 490 provided for each subscriber terminal 20. However, it will be understood by those skilled in the art that any number of PLTEST processors 490 may be provided, dependent for example on the level of testing that is required within the system.

When the PLTEST processor 490 receives a test event, then it accesses the sequence set 510 in order to determine the sequence that should be executed as a result of that event. Unlike the sequence set 500 associated with each PLSIG processor 480, the sequence set 510 is typically not state dependent, and so the sequence set 510 may be implemented as a simple lookup table. As with the process performed by the PLSIG processors 480, the PLTEST processor 490 is arranged to return to the POTS manager 460 a pointer to the appropriate sequence that needs to be performed as a result of the receipt of the particular test event. Then, the POTS manager 460 will allocate the macroprocessor 520 to the PLTEST processor 490, and that test sequence will be executed with reference to the instructions in the instruction set 530.

Further, the PLTEST processor 490 may be connected to test hardware drivers 570, which in turn are connected to various items of test hardware 560. This provides an alternative route by which test events may be received by the PLTEST processor 490. However the test events are received, they will result in a sequence being retrieved from the sequence set 510 and then executed by the macroprocessor 520, and this may result in certain test result events being returned to the POTS manager 460 to cause a message to be generated for passing via the relay 450 and the I/O port 440 for transmission over the wireless link 435 to the central terminal 10.

In preferred embodiments, there is only one macroprocessor 520 per ST, this microprocessor being owned by the POTS manager 460, and allocated to particular PLSIG processors 480, or to the PLTEST processor 490, as required. However, it will understood by those skilled in the art that there is no requirement to have only one macroprocessor 520, and, if appropriate, more than one microprocessor could be provided in order to, for example, improve processing speed.

It should also be noted that, in accordance with preferred embodiments, the macroprocessor 520 has access to a single instruction set 530, containing a core set of instructions which can be used to define all of the various signaling and testing sequences within the sequence sets 500 and 510. This core set of instructions is tailored particularly for performing signaling and testing procedures.

By the above described approach, both the message set defining the messages transferred between the central terminal and the subscriber terminal, and the instruction set defining the instructions executable by the macroprocessor 520, can be provided by a relatively small set of messages and instructions, which are independent of any particular telecommunications protocol, and are therefore country independent. Then, sequence sets 500 and 510 can be defined for each particular telecommunications protocol, and hence for each particular country requirements, each sequence in the sequence set still being defined using the basic core set of instructions, and still being associated with a particular message within the message set. This approach provides a particularly efficient way of handling and processing the various signaling and testing procedures that need to be performed by the subscriber terminal 20.

The following list illustrates the instructions included within the instruction set 530 in preferred embodiments:

Instructions Common to Signaling and Testing

ALARM—used to issue an alarm to an alarm manager, and to terminate a sequence.
CALL_STATE—stores the new state value in a call state register of the signaling or test processor
END—terminates a sequence
EXIT—terminates a sequence, all buffered results are sent to the CT
GOTO—executes a Go To operation
LINEFEED—programs in the line feed information passed in Operand A
PUSH_RESULT_STACK—stores in the result stack the value address by Operand A
STORE_DIGIT—stores a digit in the next free location of the result buffer and the next free location of the dialled digit stack
STOP_TIMEOUT—stops signaling or test processor timeout timer
TEST_EQ—compares the two values in operands A and B using the equals to test operator
TEST_NEQ—compares the two values in operands A and B using the not equals to test operator
TEST_LE—compares the two values in operands A and B using the less than or equals to test operator
TEST_LT—compares the two values in operands A and B using the less than test operator
TEST_GE—compares the two values in operands A and B using the greater than or equals to test operator
TEST_GT—compares the two values in operands A and B using the greater than test operator Instructions for Line Testing ABORT_TEST—immediately aborts a line test sequence and executes the LINEFEED and RESET_RELAYS commands
ADD—adds the numbers X and Y, the source of the X and Y being defined by Operand A
ADC—adds the numbers X and Y and adds in the state of a condition flag, the source of the X and Y being defined by Operand A
ADC_READ—initiates an analog to digital converter reading
RELAY—activates or deactivates a line test relay
RESET_RELAYS—resets all of the line test relays to their quiescent state
SUB—subtracts the number X from the number Y, the source of the X and Y being defined by Operand A
SBC—subtracts with carry the number X from the number Y, the source of the X and Y being defined by Operand A
TEST_DIAL_TONE—sets the condition flag to the state of the dial tone detector
TEST_HOOK_SWITCH—sets the condition flag to the state of the Hook switch
TIMER_READ—stores in the result stack the current value stored in the selected timer
TIMER_START—starts a timer which can be used to measure the length of time until an event occurs
TIMER_TEST—sets the condition flag if the timer is greater than or equal to the timer test value
WAIT_MSEC—suspends execution of commands for a fixed interval
WAIT_SEC—suspends execution of commands for a fixed interval Instructions for Signaling ABORT—immediately terminates a command sequence
CPE_TONE—applies a single tone or a combination of tones to the line
DIALLING_MODE—modifies the dialling mode flag
RADIO_ACCESS—issues normal or priority requests for radio access and a request for clearing the radio access
TEST_DIAL_MODE—sets the condition flag to the state of the dialling mode flag
TEST_PRIORITY_NUMBER—sets the condition flag if there is a priority number match To illustrate how sequences are formed from these instructions, the following is an example of a SETUP sequence executed during the establishment of a call:

| PC | Instruction | Operand A | Operand B | Result stack index | Description |
|---|---|---|---|---|---|
| 1 | LINEFEED | ISA_AO | 0 | 0 | Set SLIC to reverse current feed |
| 2 | LINEFEED | RINGING | ISA_A1 | 0 | Set SLIC to ringing feed |
| 3 | PUSH_RESULT_STACK | ALERTING | SIGNAL-LING_ID | +1 | |
| 4 | CALL_STATE | INCOMING_CALL_RECEIVED | 0 | +1 | Set call mode to incoming Call Proceeding |
| 5 | EXIT | | | 0 | Send Result Buffer |

The linefeed instruction is included so that if the Ringer were still to be active when the ring pulse timer expires then the linefeed reverts from RINGING to the last recorded line feed.

This SETUP sequence relies on the Call Setup message including two parameters, which are placed in the input stack.

Param 1==Linefeed code

Param 2==Max duration of ring pulse.

Figure 8A:
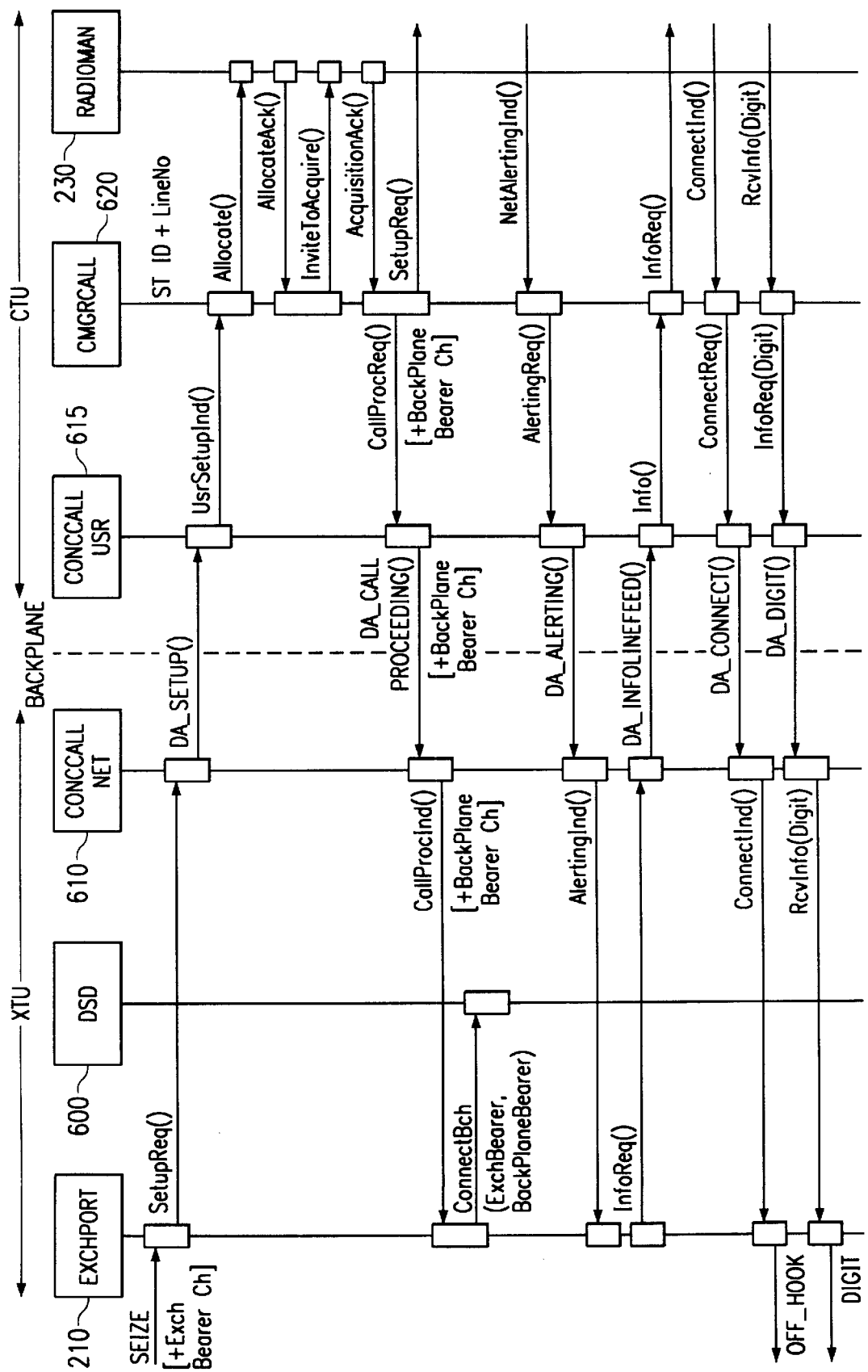
FIGS. 8A to 8C are interaction diagrams illustrating one example of the signaling events taking place during the set up of an incoming call to a subscriber terminal.

Having discussed the elements provided within the subscriber terminal to handle signaling and testing events in preferred embodiments, the sequence of signaling events generated from the exchange port 210 of the access concentrator 100 to the signaling processor 480 of the subscriber terminal 20 to establish an incoming call will now be discussed in detail with reference to FIGS. 8A to 8C, which are interaction diagrams illustrating the interaction of the various elements within the access concentrator, central terminal and subscriber terminal. For the example illustrated in FIGS. 8A to 8C, it is assumed that the signaling processor 480 is an "IDLE" state prior to establishment of the incoming call.

Initially, for an incoming call, the exchange port 210 receives a SEIZE message over an E1 line from the exchange, this SEIZE message indicating the presence of an incoming call. In preferred embodiments, this SEIZE message actually takes the form of a repeated pattern of bits, and its position in the E1 time slots identifies the exchange bearer channel. As mentioned earlier when discussing FIG. 5, each subscriber terminal line has a dedicated bearer channel on an E1 line, and hence the exchange bearer channel identifies the subscriber terminal line to which the incoming call is directed.

The exchange port 210 responds to the SEIZE message by issuing a SetupReq( ) function call to a CONCCALL object 610. A CONCCALL object is actually provided at either end of the backplane connecting the XTU 110 and the CTU 120, these CONCCALL objects 610, 615 terminating a three layer protocol used to communicate over the backplane. In preferred embodiments, layer 2 of the protocol is based on the Q.921 standard, and layer 1 is a "High Level Data Link Control" (HDLC) layer. To distinguish between the two CONCCALL objects, one is referred to as the CONCCALL NET object 610, this being the CONCCALL object closest to the telecommunications network with which the exchange port communicates, whilst the other CONCCALL object is referred to as the CONCCALL USR object 615, this being the CONCCALL object on the subscriber, or user, side of the system.

The SetupReq( ) function call includes attributes identifying the subscriber terminal line to which the incoming call is directed, and the modem shelves of the central terminal that the subscriber terminal can acquire on, this information having been retrieved from the appropriate database 150 accessible by the XTU 110.

For signaling purposes, a common fixed signaling channel is provided over the backplane, and over the backhaul, and signaling events are communicated over the fixed signaling channel via messages, the same set of messages being defined for communication over both the backplane and the backhaul. Hence, upon receipt of the SetupReq( ) function call, the CONCCALL object 610 creates a DA_SETUP message used to transfer the information contained within the SetupReq( ) function call over the backplane to the CONCCALL USR object 615. Here, the DA_SETUP message is decoded to generate a UsrSetupInd( ) function call for passing to a call manager call (CMGRCALL) object 620. The attributes of the UsrSetupInd( ) function call are identical to the attributes of the SetupReq( ) function call issued by the exchange port 210.

The CMGRCALL object 620 is created by the call manager 220 to handle the signaling events of a particular call, and hence a CMGRCALL object 620 will exist for each call currently being handled by the access concentrator 100. Each CMGRCALL object created is identified by an ST identifier and Line Number corresponding to the subscriber terminal line to which the incoming call is directed.

The CMGRCALL object 620 is arranged, upon receipt of the UsrSetupInd( ) function call, to issue an "Allocate( )" function call to the radio manager 230, instructing the radio manager to allocate a radio slot for the incoming call. To reduce the complexity of the figures, the actual process performed by the radio manager 230 is not illustrated in FIG. 8A, this having been discussed in more detail earlier with reference to FIG. 6. Once the radio manager 230 has received an indication from a radio slave 240 that a radio slot is available for allocation to the incoming call, then the radio manager is arranged to issue an AllocateAck( ) function call to the CMGRCALL object 620. At this point, the CMGR-CALL object 620 sends an InviteToAcquire( ) function call to the radio manager 230, which then causes the radio manager 230 to arrange for the subscriber terminal to be invited to acquire a wireless link on the determined radio slot. Again, this process has been discussed previously with reference to FIG. 6. Once the subscriber terminal has acquired the radio slot, the radio manager 230 issues an AcquisitionAck( ) function call to the CMGRCALL object 620 to confirm that the wireless link has been established. Further, the radio manager 230 is arranged at this point to allocate a backplane bearer channel over which the incoming call data can pass, and this information is also provided to the CMC-RCALL object 620. The backplane bearer channel allocated by the radio manager for the backplane determines which bearer channel is used for the backhaul, in preferred embodiments there being a fixed relationship between backplane and backhaul bearer channels.

The CMGRCALL object 620 is then arranged to issue a CallProcReq( ) function call to the CONCCALL USR object 615, this function call also including an indication of the backplane bearer channel allocated by the radio manager. This function call causes the CONCCALL USR object 615 to generate a DA_CALL PROCEEDING message for transmission over the backplane to the CONCCALL NET object 610, this message also including the details of the backplane bearer channel that has been assigned for the incoming call.

The CONCCALL NET object 610 then decodes the DA_CALL PROCEEDING message, and generates a CallProcInd( ) function call for transmission to the exchange port 210, and identifying the backplane bearer channel assigned. The exchange port 210 responds to this function call by generating a ConnectBch function call for transmission to a digital switch 600, this function call identifying the exchange bearer channel provided in the SEIZE message from the exchange, and the backplane bearer channel assigned by the radio manager for the incoming call.

The digital switch 600 responds to this function call by connecting the identified exchange bearer channel to the assigned backplane bearer channel, thereby providing a route for the incoming call.

At the time the CMGRCALL object 620 issues the CallProcReq( ) function call to the CONCCALL USR object 615, it is also arranged to issue a SetupReq( ) function call to another CONCCALL NET object 630, this CONCCALL NET object terminating a three layer interface that exists over the backhaul between the CTU 120 of the access concentrator 100 and the DTU 130 of the central terminal 10.

Figure 8B:
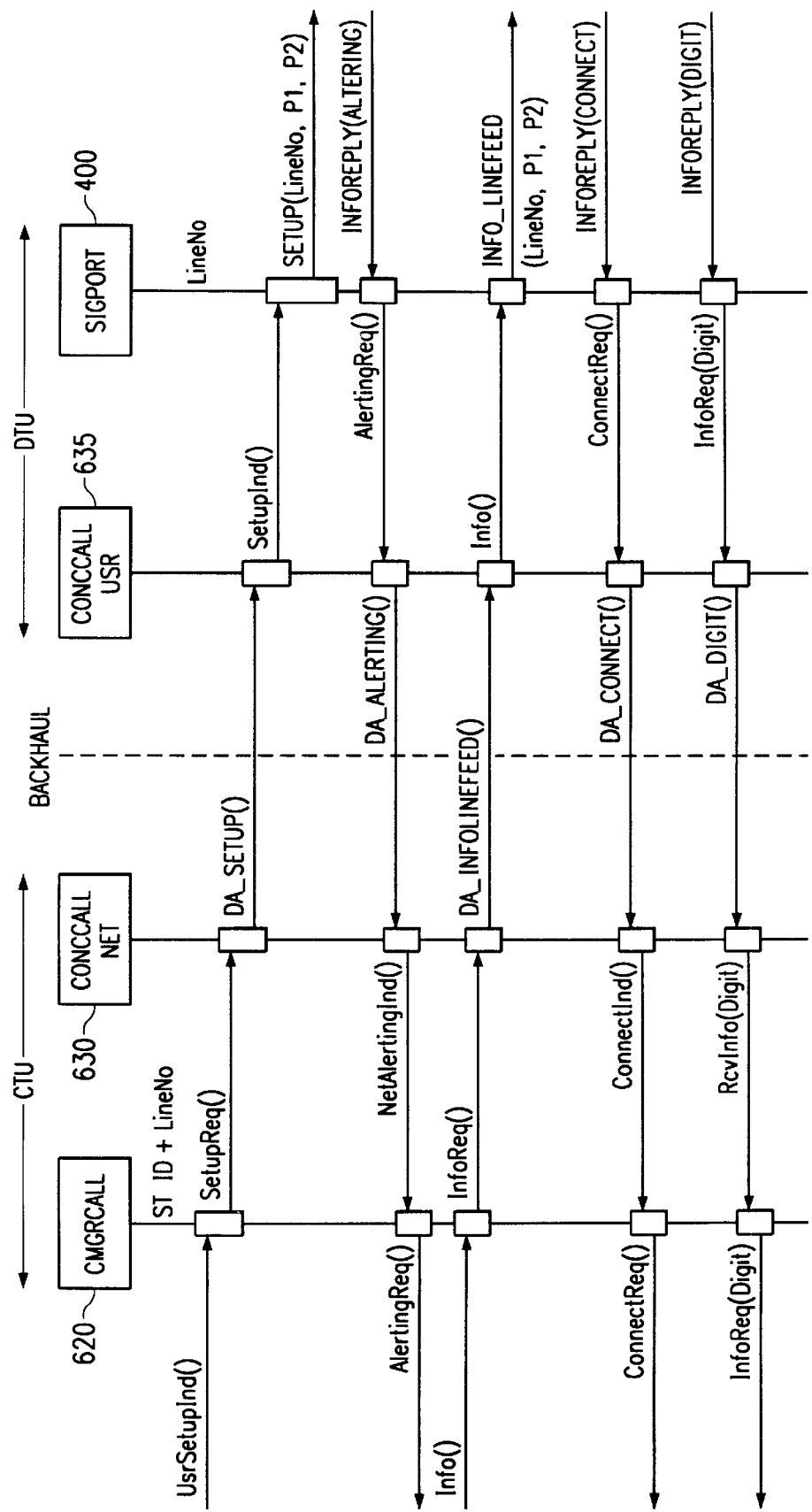

The CMGRCALL object 620 has been reproduced in FIG. 8B to clearly illustrate that the SetupReq( ) function call originates from the CMGRCALL object 620 and is destined for the CONCCALL NET object 630. FIG. 8B also shows the UserSetupInd( ) function call arriving at the CMGR-CALL object 620, but, for the sake of simplicity, all of the intermediate function calls illustrated in FIG. 8A have been omitted.

As mentioned earlier, the same set of messages is used over the backhaul as is used over the backplane. Hence, the CONCCALL NET object 630 responds to the SetupReq( ) function call by issuing a DA_SETUP message to a corresponding CONCCALL USR object 635 within the DTU 130 at the other end of the backhaul. The CONCCALL USR object 635 decodes this DA_SETUP message, and generates a SetupInd( ) function call for passing to the SIGPORT 400. As mentioned previously, in preferred embodiments there is one SIGPORT 400 for each subscriber terminal line, and since the initial SetupReq( ) function call issued by the exchange port 210 identified a subscriber terminal line, the CONCCALL USR object 635 can ensure that the SetupInd( ) function call that it issues is directed to the appropriate SIGPORT 400.

As discussed earlier with reference to FIG. 7, upon receipt of signaling events, the SIGPORT 400 is arranged to access a message set 410 defining the messages that can be passed over the wireless link between the central terminal and the subscriber terminal. It should be noted that this message set 410 is in preferred embodiments different to the message set used for the backplane and the backhaul.

Hence, in this instance, the SIGPORT 400 responds to the receipt of the SetupIndo function call by accessing the message set 410 and determining that a SETUP message should be transmitted to the subscriber terminal. Thus, the SIGPORT 400 generates the SETUP message and outputs it to the SIGMUX 420, this SETUP message including as attributes the line number to which the signaling event is directed, and two further parameters P1 and P2. These two parameters are used when executing the signaling sequence determined by the relevant signaling processor 480, and the information contained within these two parameters will vary depending on the state of the call process. However, assuming the signaling processor 480 is in the IDLE state at the time the call is being setup, then the parameters P1 and P2 included within the SETUP message will identify a line feed code, and a maximum duration of a ring pulse for the telecommunications equipment connected to the line, respectively.

Figure 8C:
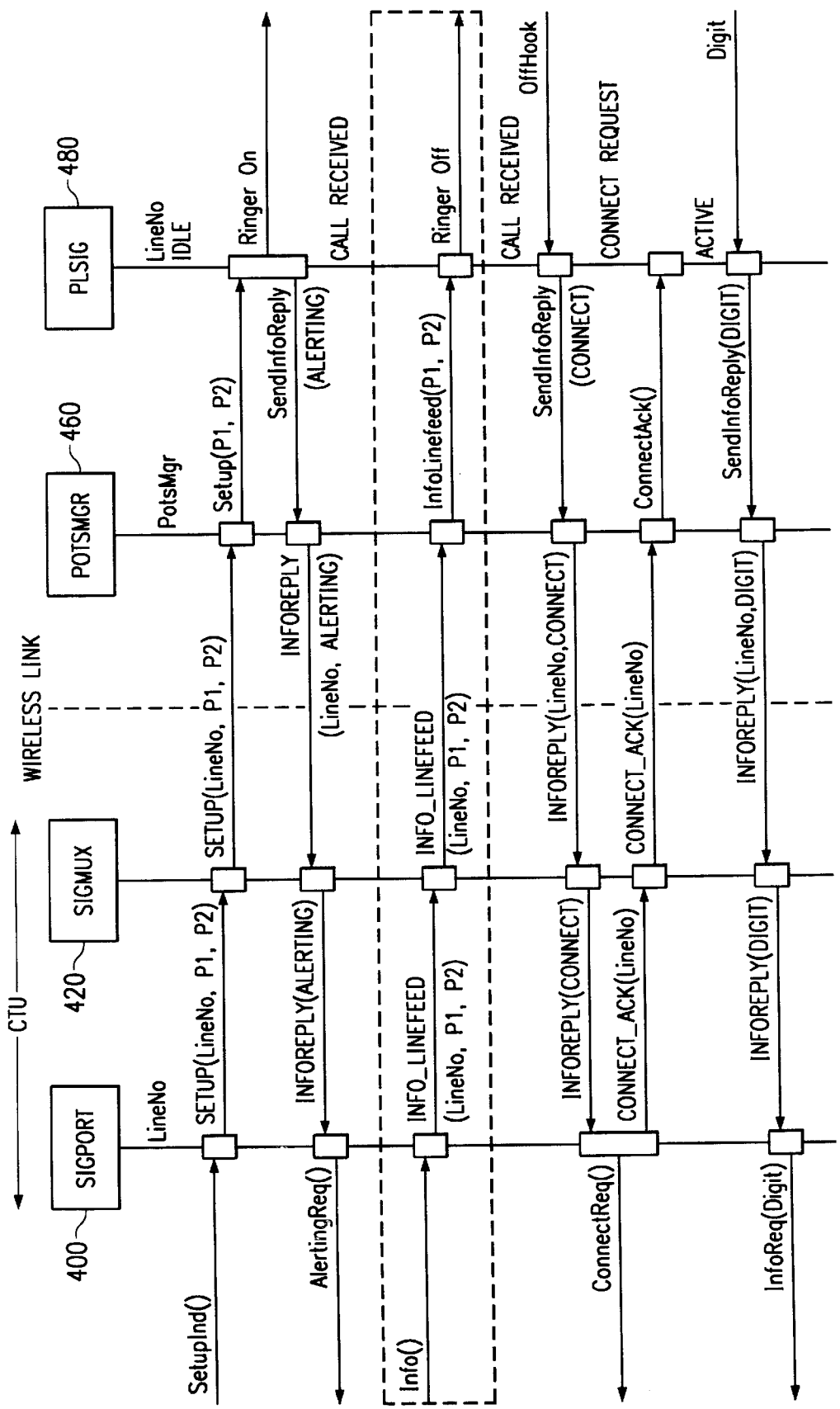

As illustrated in FIG. 8C, the SIGMUX 420 then issues the SETUP message for transmission over the wireless link to the subscriber terminal. This SETUP message is received by the POTS manager 460 within the subscriber terminal, which then accesses the message set 470 (identical to the message set 410) to decode the SETUP message. The POTS manager 460 also extracts the line number information from the SETUP message in order to determine the signaling processor 480 to which the setup signaling event is directed. It then issues a Setup function call to that appropriate signaling processor 480 including as parameters the values P1 and P2.

A three layer protocol transport mechanism is used to communicate over the wireless link between the SIGPORT 400 and the signaling processor 480, the SIGPORT 400 and signaling processor 480 terminating the three layer protocol. In preferred embodiments, layer 2 of the protocol is based on the Q.921 standard, and layer 1 is a "High Level Data Link Control" (HDLC) layer. Layer 2 and Layer 1 of the protocol are provided within the I/O ports 430 and 440 in preferred embodiments.

The signaling processor 480 will respond to the Setup( ) function call by issuing appropriate signals to the subscriber terminal hardware drivers 550 so as to cause the ringer on the telecommunications equipment to turn on.

Once, this has been done, the signaling processor 480 will issue a SendInfoReply( ) function call to the POTSMGR 460 requesting the POTSMGR to issue an INFOREPLY message. The INFOREPLY message is a generic type of message used on the uplink signaling communication between the subscriber terminal and the central terminal, a parameter of this generic INFOREPLY message being used to indicate the type of signaling event responsible for the issuing of the INFOREPLY message. By providing a single predetermined signaling message, such as the INFOREPLY message, for uplink signaling communications between the subscriber terminal and the central terminal, savings in the bandwidth required for such signaling messages can be achieved, since less bits are required to define the message. Further, the INFOREPLY message is arranged such that it may have a number of parameters, each parameter identifying a different signaling event, thereby enabling a plurality of signaling events to be combined into a single INFOREPLY signaling message, thereby achieving even greater savings in bandwidth.

The SendInfoReply( ) function call issued by the signaling processor includes a parameter identifying an ALERTING signaling event, this signaling event identifying that the item of telecommunications equipment has been alerted to the presence of an incoming call. Upon receipt of this SendInfoReply( ) function call the POTSMGR 460 references the message set 470 in order to construct the INFOREPLY message, including as parameters of that INFOREPLY message, the line number that the signaling processor 480 is associated with, and an indication that the signaling event represented by the INFOREPLY message is an ALERTING signaling event.

Upon receipt of the INFOREPLY message by the SIGMUX 420, the SIGMUX is arranged to reference the message set 410 to determine from the INFOREPLY message the line number information, so as to determine which SIGPORT 400 to route the INFOREPLY message to. Having done this, the SIGMUX 420 passes the INFOREPLY message on to the SIGPORT 400 corresponding to the determined line number.

As shown in FIG. 8B, the SIGPORT 400 then issues an AlertingReq( ) function call to the CONCCALL USR object 635, to request that the CONCCALL USR object 635 issues a DA_ALERTING message over the backhaul to the access concentrator 100.

The DA_ALERTING message is then received by the CONCCALL NET object 630 within the CTU 120, and decoded to generate a NetAlertingInd( ) function call sent to the CMGRCALL object 620. As illustrated in FIG. 8A, the CMGRCALL object 620 then issues an AlertingReq( ) function call to the CONCCALL USR object 615, causing that CONCCALL USR object to issue the DA_ALERTING message to the CONCCALL NET object 610 within the XTU 110. The CONCCALL NET object 610 then issues an AlertingInd( ) function call to the exchange port 210, thereby notifying the exchange port 210 that the item of telecommunications equipment connected to the identified line has been alerted to the presence of an incoming call.

In preferred embodiments, the Setup function call issued to the signaling processor 480 described earlier turns the ringer on. However, further messages are preferably sent corresponding to each edge of the ring pulse, thereby turning the ringer off and on at predetermined intervals. To achieve this, the exchange port 210 issues an InfoReq( ) function call to the CONCCALL NET object 610, to cause a DA_INFOLINEFEED message to be sent to the CONCCALL USR object 615. The CONCCALL USR object 615 then converts this to an Info( ) function call, including as parameters the line feed code and the duration. The CMGRCALL object 620 receives this Info( ) function call, and then generates an InfoReq( ) function call to the CONCCALL NET object 630 to cause the DA_INFOLINEFEED message to be passed to the CONCCALL USR object 635 within the DTU 130.

The CONCCALL USR object 635 decodes this message to generate an Info( ) function call to the SIGPORT 400 corresponding to the line, and then as illustrated in FIG. 8C, the SIGPORT 400 references the message set 410 in order to determine that an INFO_LINEFEED message should be sent to the subscriber terminal. It then generates the INFO_LINEFEED message, identifying as parameters the line number, and the parameters P1 and P2 which provide the line feed code and duration information.

The SIGMUX 420 receives the INFO_LINEFEED message and then issues the INFO_LINEFEED message to the POTSMGR 460, which decodes that message with reference to the message set 470, and passes on an InfoLinefeed( ) function call to the appropriate signaling processor 480. The signaling processor 480 then identifies the appropriate sequence to be performed by the macroprocessor 520, operation of this sequence causing the ringer of the item of telecommunications equipment to be turned off and on at predetermined intervals. This process of issuing InfoReq( ) function calls from the exchange port 210 is repeated until an offhook signaling event is generated by the item of telecommunications equipment, or the person making the incoming call determines that the call is not going to be accepted, and hence terminates the call.

Assuming the call is answered at the subscriber terminal, then the signaling processor 480 will receive via the ST hardware drivers 550 an offhook signaling event, and will respond to this event by issuing a SendInfoReply( ) function call to the POTSMGR 460, requesting the POTSMGR to issue an INFOREPLY message. In this instance, a parameter in the function call will identify that the signaling event to be represented by the INFOREPLY message is a CONNECT signaling event, indicating that the call has been accepted.

POTSMGR 460 will then generate the INFOREPLY message with reference to the message set 470, and transmit that INFOREPLY message to the SIGMUX 420, parameters of the INFOREPLY message being used to identify the line number, and to include as an attribute an indication that the signaling event represented is a CONNECT signaling event. This will cause the SIGMUX 420 to determine the line number information from the message and to then pass the INFOREPLY message (minus the line number information) to the appropriate SIGPORT 400, which then issues a ConnectReq( ) function call to the CONCCALL USR object 635, requesting the CONCCALL USR object 635 to issue a DA_CONNECT message.

This DA_CONNECT message is then sent over the backhaul to the CONCCALL NET object 630 in the CTU, and this results in a ConnectInd( ) function call being issued to the CMGRCALL object 620, the CMGRCALL object 620 then issuing a ConnectReq( ) function call to the CONCCALL USR object 615.

The CONCCALL USR object 615 will then issue a DA_CONNECT message to the CONCCALL NET object 610 over the backplane, and this will cause a ConnectInd( ) function call to be issued to the exchange port 210. The exchange port 210 will then issue an offhook message to the exchange to notify the exchange that the call has been received. Returning to the SIGPORT 400, in addition to issuing the ConnectReq( ) function call to the CONCCALL USR object 635, the SIGPORT 400 also issues a CONNECT_ACK message to the SIGMUX 420 in preferred embodiments. The SIGMUX 420 then passes the CONNECT_ACK message to the POTSMGR to confirm that the connect event received by the signaling processor 480 has been transmitted on to the exchange. Hence, upon receipt of the CONNECT_ACK message, the POTSMGR 460 routes a ConnectAck( ) function call to the signaling processor 480, which then enters the ACTIVE state. At this point the call is connected, and data traffic, such as speech data, can begin.

During an incoming call, the user may enter digits to invoke supplementary services. In such a situation, as illustrated in FIG. 8C, a digit signaling event is received by the signaling processor 480 from the corresponding ST hardware 540, and this causes the signaling processor 480 to issue a SendInfoReply( ) function call to the POTSMGR 460, including as an attribute of that function call the digit entered by the user. The POTSMGR 460 then references the message set 470 to generate an INFOREPLY message including as parameters the line number of the telecommunications equipment responsible for the digit signaling event, and the digit entered by the user. In preferred embodiments, a number of separate digits can be included in a single signaling event received by the signaling processor 480, in which case those digits will be combined into a single INFOREPLY message sent from the POTSMGR 460 to the SIGMUX 420. The SIGMUX 420 then determines the line number information from the INFOREPLY message and passes the INFOREPLY message on to the appropriate SIGPORT 400.

The SIGPORT 400 receives the INFOREPLY message, and generates an InfoReq( ) function call to the CONCCALL USR object 635, including as a parameter the digit(s) specified within the RcvInfo( ) function call. This causes the CONCCALL USR object 635 to generate a DA_DIGIT message for passing to the CONCCALL NET object 630 within the CTU 120, which then decodes that message to generates a RcvInfo( ) function call for passing to the CMGRCALL object 620.

The CMGRCALL object 620 then generates an InfoReq( ) function call to the CONCCALL USR object 615, which causes a DA_DIGIT message to be sent over the backplane to the CONCCALL NET object 610. Here the CONCCALL NET object 610 decodes the DA_DIGIT message, to generate a RcvInfo( ) function call for passing to the exchange port 210. At this point, the digit(s) can be provided from the exchange port over the appropriate E1 connection to the exchange.

Figure 9A:
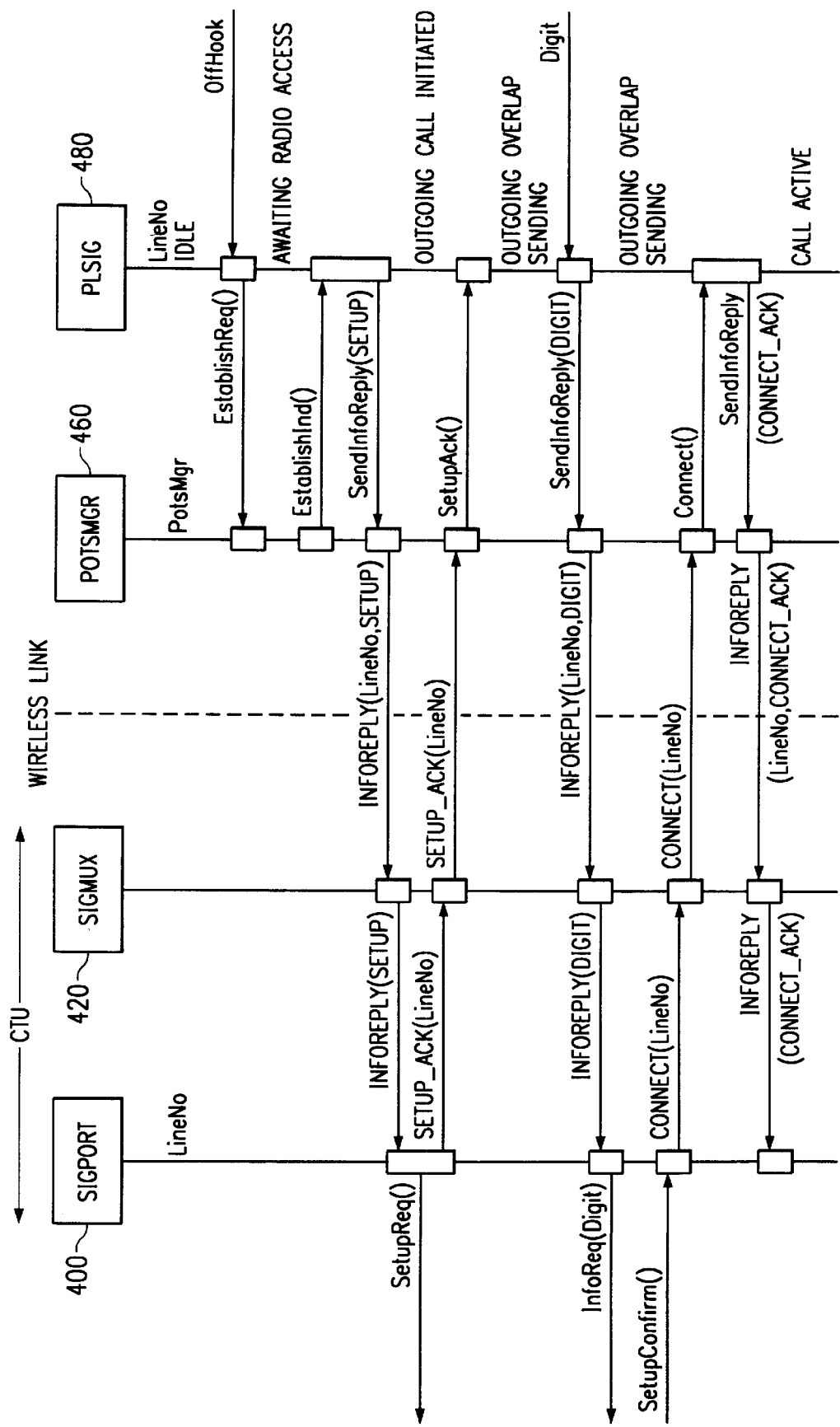
FIGS. 9A to 9C are interaction diagrams illustrating one example of the signaling events taking place during the set up of an outgoing call from the subscriber terminal.

Having discussed the sequence of signaling events generated during the establishment of an incoming call, the sequence of signaling events generated to establish an outgoing call will now be discussed in detail with reference to FIGS. 9A to 9C.

Assuming that the signaling processor 480 for a particular telecommunications line is in the "idle" state, and the item of telecommunications equipment connected to that line then goes offhook to initiate an outgoing call, then the signaling processor 480 will respond to the offhook signaling event received from the corresponding hardware driver 550 by issuing an EstablishReq( ) function call to the POTSMGR 460. The signaling processor 480 will then enter an "AWAITING RADIO ACCESS" state. The POTSMGR 460 then contacts the Radio Port Slave 260 to cause the process described earlier with reference to FIG. 6 to be employed in order to acquire a radio slot on the wireless link for the outgoing call. Once the wireless link has been established, then the POTSMGR 460 is arranged to issue an EstablishInd( ) function call to the signaling processor 480. This then causes the signaling processor 480 to issue a SendInfoReply( ) function call to the POTSMGR to request the POTSMGR to issue an INFOREPLY message over the wireless link, a parameter of the function call identifying that the INFOREPLY message should be used to represent a Setup signaling event. Once the SendInfoReply function call has been issued by the signaling processor 480, it enters the "OUTGOING CALL INITIATED" state.

The INFOREPLY message subsequently issued by the POTSMGR 460 will indicate as parameters the line number associated with the signaling processor 480, and an indication that the INFOREPLY message represents a Setup signaling event, the SIGMUX 420 determining the line number information from this INFOREPLY message, and then routing the INFOREPLY message to the SIGPORT 400 associated with the particular telecommunications line.

Figure 9B:
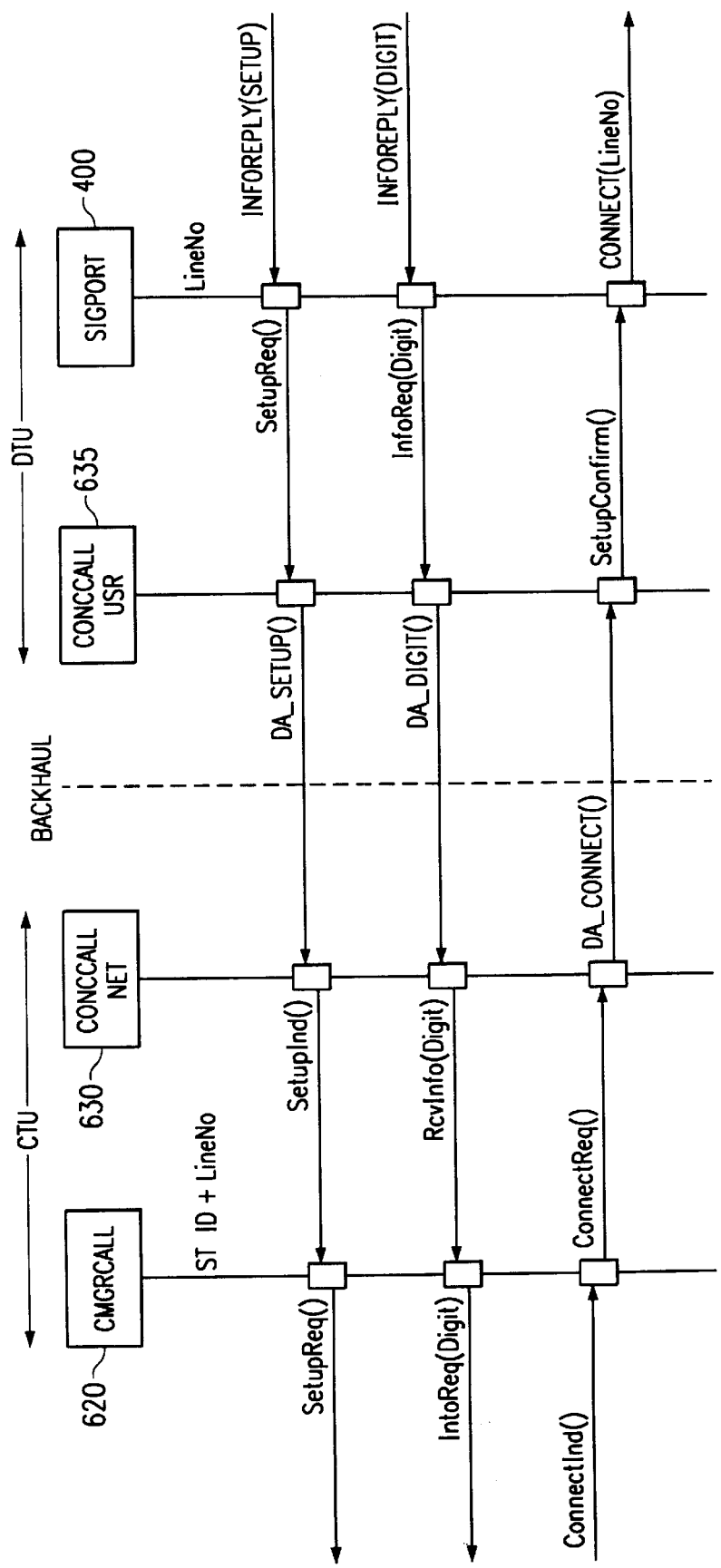
Figure 9C:
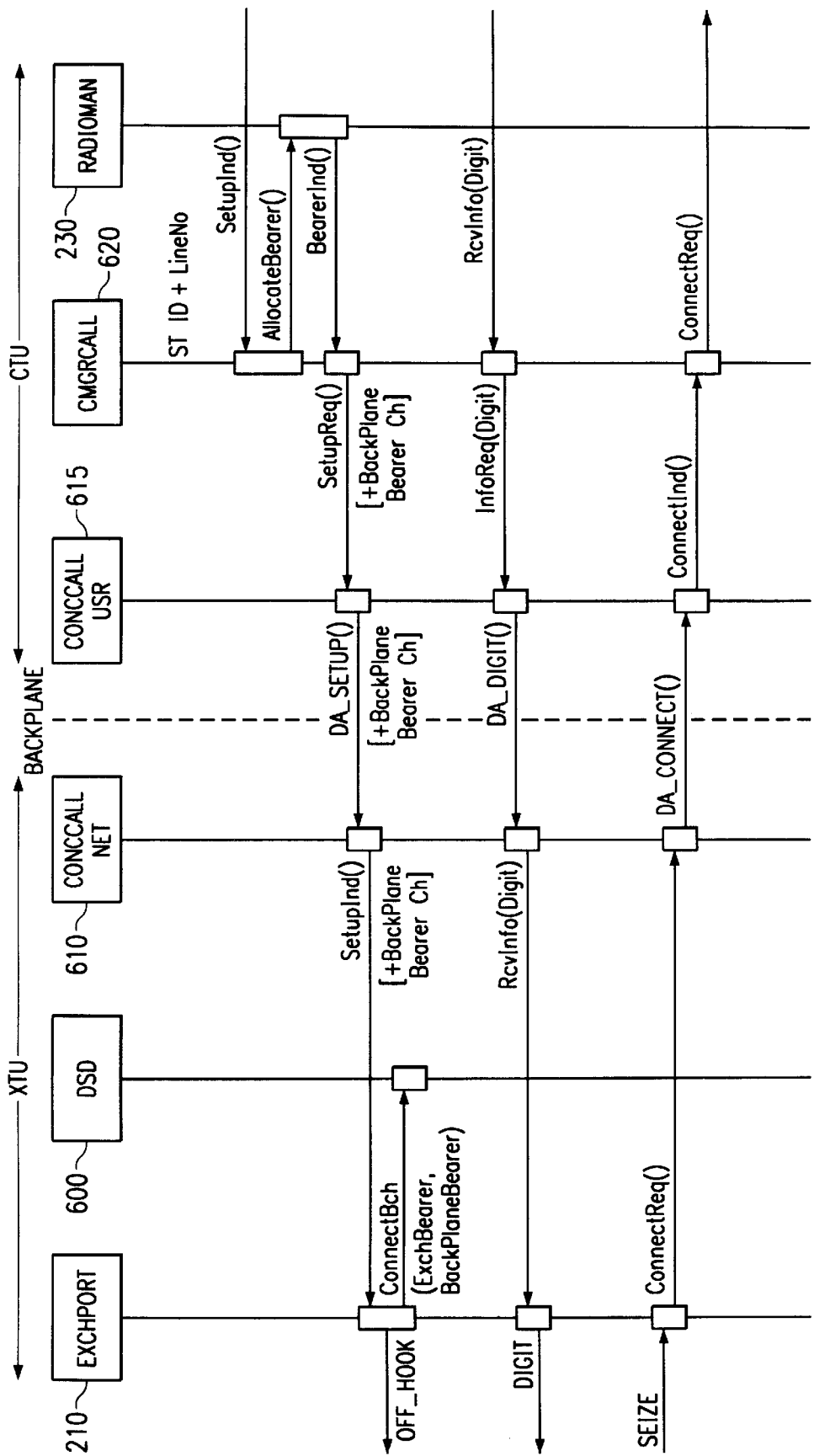

As indicated in FIG. 9B, the SIGPORT 400 will respond to the INFOREPLY message by issuing a SetupReq( ) function call to the CONCCALL USR object 635, thereby requesting the CONCCALL USR object 635 to issue a DA_SETUP message over the BACKHAUL to the CTU 120 in the Access Concentrator 100.

The CONCCALL NET object 630 in the CTU 120 decodes this DA_SETUP message, to generate a SetupInd( ) function call to the CMGRCALL object 620. At this point, the CMGRCALL object 620 employs the radio manager 230 to allocate a Backplane Bearer channel to be used to carry the data traffic associated with this outgoing call. This is achieved by the CMGRCALL object 620 issuing an AllocateBearer( ) function call to the radio manager 230, which then provides within a BearerInd function call returned to the CMGRCALL object 620 an indication of the Backplane Bearer channel that has been allocated.

The CMGRCALL object 620 then issues a SetupReq( ) function call to the CONCCALL USR object 615, to cause a DA_SETUP message to be transferred over the Backplane to the CONCCALL NET object 610 within the appropriate XTU 110. This DA_SETUP message includes an indication of the Backplane Bearer channel as allocated by the radio manager 230. The CONCCALL NET object 610 then decodes this DA_SETUP message to generate a SetupIndo function call to the EXCHPORT 210, including an indication of the Backplane Bearer channel that has been allocated.

At this point, the EXCHPORT is arranged to issue a ConnectBch( ) function call to the digital switch 600, to cause the digital switch to connect the Exch Bearer channel associated with the telecommunications line with the BackPlane Bearer channel allocated by the radio manager 230, and notified to the EXCHPORT 210 via the SetupInd( ) function call.

Further, the exchange port issues an OFF-HOOK signal to the exchange over the appropriate El line to indicate that an outgoing call is to be made.

Returning to FIG. 9A, it can be seen that the SIGPORT 400 not only issues the SetupReq( ) function call upon receipt of the INFOREPLY (SETUP) message, but also returns a SETUP_ACK message to the SIGMUX, including as a parameter the line number of the telecommunications line associated with the SIGPORT 400. This causes the SIGMUX 420 to route the SETUP_ACK message to the POTSMGR 460, which then decodes that message to generate a SetupAck( ) function call for sending to the signaling processor 480. Upon receipt of the SetupAck( ) function call, the signaling processor 480 enters the "OUTGOING OVERLAP SENDING" state.

Once in the "OUTGOING OVERLAP SENDING" state, the signaling processor 480 is arranged to receive digit signaling events identifying a digit, or digits, of the telephone number of the equipment to which the outgoing call is directed. Each time a digit signaling event is received at the signaling processor 480, it issues a SendInfoReply( ) function call to the POTSMGR 460, including as attributes of that function call the digit or digits entered by the user. The POTSMGR 460 then references the message set 170 to generate an INFOREPLY message including as parameters the line number of the telecommunications equipment responsible for the digit signaling event, and the digit(s) entered by the user. In preferred embodiments, as mentioned earlier with reference to FIGS. 8A to 8C, a number of digits can be combined into a single INFOREPLY message. Upon receipt of the INFOREPLY message, the SIGMUX 420 is arranged to determine the line number information, and to pass the INFOREPLY message on to the appropriate SIGPORT 400.

The SIGPORT 400 receives the INFOREPLY message, and generates an InfoReq( ) function call for passing to the CONCCALL USR object 635, identifying the digit(s) included within the INFOREPLY message. This causes the CONCCALL USR object 635 to issue a DA_DIGIT message to the CONCCALL NET object 630, which then decodes that message to generate a RcvInfo( ) function call for transmission to the CMGRCALL 620, including as a parameter the digit(s) identified in the DA_DIGIT message.

The CMGRCALL object 620 then issues an InfoReq( ) function call to the CONCCALL USR object 615, which then generates a DA_DIGIT message for transmission to the CONCCALL NET object 610, causing the CONCCALL NET object 610 to issue a RcvInfo( ) function call to the EXCHPORT 210 identifying the digit(s). This digit information is then output over the appropriate E1 line to the exchange.

When the destination telecommunications equipment answers the call, the exchange will issue a SEIZE message to the EXCHPORT 210. This will cause the EXCHPORT 210 to issue a ConnectReq( ) function call to the CONCCALL NET object 610, to cause a DA_CONNECT message to be sent over the BACKPLANE to the CONCCALL USR object 615. Here, the message will be decoded to generate a ConnectInd( ) function call for transmission to the CMGRCALL object 620, which then generates a ConnectReq( ) function call for sending to the CONCCALL NET object 630. Here, the function call is converted to a DA_CONNECT message to be sent over the BACKHAUL to the CONCCALL USR object 635, which then issues a SetupConfirm( ) function call to the SIGPORT 400 confirming that the setup procedure is completed.

The SIGPORT 400 then references the message set 410 to determine that a CONNECT message should be sent to the subscriber terminal, and accordingly issues the CONNECT message to the SIGMUX 420, identifying as a parameter the line number of the telecommunications equipment to which the connect signaling event is directed. As shown in FIG. 9A, the SIGMUX 420 then routes the CONNECT message over the wireless link to the POTSMGR 460, which then generates a Connect( ) function call to the signaling processor 480.

In preferred embodiments, the signaling processor 480 is then arranged to issue a SendInfoReply( ) function call to the POTSMGR 460, indicating as a parameter of that function call that the INFOREPLY message should be used to represent a CONNECT_ACK signaling event. Accordingly, the POTSMGR 460 generates an INFOREPLY message, including as parameters the line number, and an indication of the CONNECT_ACK signaling event. The SIGMUX 420 then determines the line number information and passes the INFOREPLY message on to the appropriate SIGPORT

400 to confirm to the SIGPORT 400 that the signaling processor 480 has received the CONNECT signaling event. At this point, the outgoing call is connected.

For completeness, FIG. 10 is a table listing the messages contained within the message sets 410 and 470 in preferred embodiments to represent the various signaling events communicated between the central terminal and subscriber terminal. The prefix STPOTS_SIG in the table identifies that the messages are signaling messages as opposed to test messages. The table also indicates the parameters that may be included within each message, as mentioned earlier the values associated with the parameters P1 and P2 depending on the state of the call process. Further, the table provides a brief description of each message, and the direction in which it is sent.

As mentioned earlier with reference to FIG. 7, the message sets 410 and 470 of preferred embodiments also contain messages relating to test procedures performed within the subscriber terminal. These test procedures can be invoked in a number of ways. For example, an engineer can issue test commands from an Element Manager to a Shelf Controller, such as a shelf controller on an XTU 110. A pseudo call can then be set up from the exchange port 210 to the subscriber terminal, using for example the signaling sequences discussed earlier with reference to FIGS. 8A to 8C. In preferred embodiments, the same messages are used over the backplane and backhaul as are used for signaling, but contain embedded information identifying the test event instigated by the engineer. The SIGPORT is then arranged to access the message set 410 to determine the test message to be sent over the wireless link to the subscriber terminal to represent the test event.

FIG. 11 is a table listing the messages contained within the message sets 410 and 470 in preferred embodiments to represent the various testing events communicated between the central terminal and subscriber terminal. The prefix STPOTS_LT in the table identifies that the messages are line test messages as opposed to signaling messages. As with FIG. 10, the table also indicates the parameters that may be included within each message, provides a brief description of each message, and indicates the direction in which it is sent.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

What is claimed is:

1. A telecommunications system for connecting to a telecommunications network and for routing telecommunications signals between the telecommunications network and a subscriber terminal of the telecommunications system, the telecommunications system comprising an interface mechanism for passing signaling events over a communications link between modules of the telecommunications system separated by the communications link, the interface mechanism comprising:

a network-side object on the telecommunications network side of the communications link for receiving a first signaling event from a first module of the telecommunications system and for generating a first signaling message to represent the first signaling event, the first module and network-side object being provided within a concentrator of the telecommunications system, the concentrator being arranged to transmit signals to and receive signals from the telecommunications network in an unconcentrated format, and to transmit signals to and receive signals from a central terminal of the telecommunications system over the communications link in a concentrated format;

a user-side object on the subscriber terminal side of the communications link for receiving a second signaling event from a second module of the telecommunications system separated from said first module via the communications link, and for generating a second signaling message to represent the second signaling event;

the network-side object being arranged to pass the first signaling message to the user-side object over the communications link for subsequent processing by modules on the subscriber terminal side of the communications link, and the user-side object being arranged to pass the second signaling message to the network-side object over the communications link for subsequent processing by modules on the telecommunications network side of the communications link.

2. A telecommunications system as claimed in claim 1, wherein the second module and user-side object are provided within a central terminal of the telecommunications system, the central terminal being arranged to communicate with the subscriber terminal.

3. A telecommunications system as claimed in claim 1, further comprising:

a call manager, responsive to an indication that a call is being initiated to generate as said first module a call object to handle signaling events associated with that call.

4. A telecommunications system as claimed in claim 3, wherein for an incoming call, the call object is arranged to receive a setup signaling event, and to cause the network-side object to generate a setup message including as a parameter an identifier of a telecommunications line of the subscriber terminal to which the incoming call is directed, the user-side object being arranged to decode the setup message to determine the setup signaling event, and to transfer the setup signaling event to the second module.

5. A telecommunications system as claimed in claim 4, wherein the second module is arranged to cause the setup signaling event to be transferred to the subscriber terminal, the subscriber terminal being arranged to process the setup signaling event to cause an item of telecommunications equipment connected to the telecommunications line to generate an incoming call indication.

6. A telecommunications system as claimed in claim 4, wherein the subscriber terminal is arranged to receive and transmit telecommunications signals via a wireless link, and the call object is arranged upon receipt of the setup signaling event to invoke modules of the telecommunications system to allocate a radio slot for establishing the wireless link for the incoming call.

7. A telecommunications system as claimed in claim 1, wherein the second module is a signaling port within a central terminal of the telecommunications system, the signaling port being arranged, upon receipt of the first signaling event to cause the first signaling event to be transmitted to the subscriber terminal.

8. A telecommunications system as claimed in claim 1, wherein when an incoming call is accepted at the subscriber terminal, an off-hook signaling event indicating that the incoming call is connected is generated to cause an off-hook indication to be transmitted to the second module, the second module being responsive to that off-hook indication to instruct the user-side object to generate a second message identifying that the incoming call is connected.

9. A telecommunications system as claimed in claim 1, wherein for an outgoing call from the subscriber terminal, the second module is arranged to receive a setup signaling event and to cause the user-side object to generate a setup message including as a parameter an identifier of a telecommunications line of the subscriber terminal from which the outgoing call is originated, the network-side object being arranged to decode the setup message to determine the setup signaling event, and to transfer the setup signaling event to the first module.

10. A telecommunications system as claimed in claim 9, wherein when the outgoing call is accepted by the telecommunications network, a connect signaling event indicating that the outgoing call is connected is received by the first module, and the first module is responsive to said connect signaling event to cause the network-side object to generate a connect message to represent the connect signaling event, the user-side object being arranged to decode the connect message to produce a signaling event for transferring to the subscriber terminal, confirming that the outgoing call is connected.

11. A telecommunications system as claimed in claim 1, wherein the concentrator further comprises an exchange port arranged to transmit signals to and receive signals from the telecommunications network, the exchange port being separated from the first module by a backplane, and a second network-side object and a second user-side object being provided at respective ends of the backplane to handle the communication of signaling events over the backplane.

12. A concentrator for a telecommunications system, the concentrator being arranged to transmit signals to and receive signals from a telecommunications network in an unconcentrated format, and to transmit and receive signals in a concentrated format over a communications link between the concentrator and other elements of the telecommunications system, the concentrator comprising:

a first module;

a network-side object providing an interface with a communications link between the concentrator and other elements of a telecommunications network, the network side object being arranged to receive a first signaling event from the first module and to generate a first signaling message to represent the first signaling event for transmission over the communications link;

the network-side object further being arranged to receive a second signaling message over the communications link, and to decode that second signaling message for subsequent processing by the concentrator.

13. A central terminal for a telecommunications system, the central terminal being arranged to transmit signals to and receive signals from a subscriber terminal, and to transmit and receive signals in a concentrated format over a communications link between the central terminal and other elements of the telecommunications system, the central terminal comprising:

a central terminal module;

a user-side object providing an interface with the communications link between the central terminal and other elements of a telecommunications network, the user-side object being arranged to receive a first signaling message over the communications link, and to decode that first signaling message for subsequent processing by the central terminal;

the user-side object further being arranged to receive a second signaling event from the central terminal module and to generate a second signaling message to represent the second signaling event for transmission over the communications link.

14. A method of handling signaling events in a telecommunications system arranged to be connected to a telecommunications network and to route telecommunications signals between the telecommunications network and a subscriber terminal of the telecommunications system, the method comprising the steps of:

providing a communications link between modules of the telecommunications system;

arranging a network-side object on the telecommunications network side of the communications link to receive a first signaling event from a first module of the telecommunications system, the first module and network-side object being provided within a concentrator of the telecommunications system, the concentrator being arranged to transmit signals to and receive signals from the telecommunications network in an unconcentrated format, and to transmit signals to and receive signals from a central terminal of the telecommunications system over the communications link in a concentrated format;

employing the network-side object to generate a first signaling message to represent the first signaling event;

passing the first signaling message over the communications link for subsequent processing by modules on the subscriber terminal side of the communications link;

arranging a user-side object on the subscriber terminal side of the communications link to receive a second signaling event from a second module of the telecommunications system separated from said first module via the communications link;

employing the user-side object to generate a second signaling message to represent the second signaling event; and passing the second signaling message over the communications link for subsequent processing by modules on the telecommunications network side of the communications link.

* * * * *